US012431270B2

(12) United States Patent
Kotani et al.

(10) Patent No.: US 12,431,270 B2
(45) Date of Patent: Sep. 30, 2025

(54) MAGNETIC COMPONENT AND ELECTRIC DEVICE

(71) Applicant: Panasonic Intellectual Property Management Co., Ltd., Osaka (JP)

(72) Inventors: Junichi Kotani, Hyogo (JP); Osamu Moriya, Nara (JP); Kanako Sugimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 639 days.

(21) Appl. No.: 17/800,412

(22) PCT Filed: Feb. 4, 2021

(86) PCT No.: PCT/JP2021/004046
§ 371 (c)(1),
(2) Date: Aug. 17, 2022

(87) PCT Pub. No.: WO2021/171944
PCT Pub. Date: Sep. 2, 2021

(65) Prior Publication Data
US 2023/0120688 A1 Apr. 20, 2023

(30) Foreign Application Priority Data
Feb. 26, 2020 (JP) ................................ 2020-030919

(51) Int. Cl.
*H01F 27/28* (2006.01)
*H01F 5/00* (2006.01)
(Continued)

(52) U.S. Cl.
CPC ............ *H01F 5/003* (2013.01); *H01F 17/04* (2013.01); *H01F 27/255* (2013.01)

(58) Field of Classification Search
CPC ........ H01F 5/003; H01F 17/04; H01F 27/255; H01F 3/10; H01F 2003/106; H01F 2017/048
(Continued)

(56) References Cited

U.S. PATENT DOCUMENTS

2003/0048167 A1* 3/2003 Inoue .................... H01F 41/046 336/200
2009/0002117 A1* 1/2009 Kawarai ............. H01F 17/0006 336/233
(Continued)

FOREIGN PATENT DOCUMENTS

JP 2001-250719 A 9/2001
JP 2009-009985 A 1/2009
(Continued)

OTHER PUBLICATIONS

International Search Report dated Apr. 6, 2021 issued in International Patent Application No. PCT/JP2021/004046, with English translation.

*Primary Examiner* — Shawki S Ismail
*Assistant Examiner* — Kazi S Hossain
(74) *Attorney, Agent, or Firm* — Rimon P.C.

(57) ABSTRACT

A magnetic component is configured to be used with a coil wound about a center axis along an axis direction. A first magnetic member is configured such that magnetic flux generated by the coil passes therethrough, extends in the axis direction to have first and second ends, and has a portion overlapping with the coil viewed perpendicular to the axis direction. A second magnetic member is disposed on an opposite side to the coil with respect to the first end of the first magnetic member, in the axis direction. A third magnetic member is disposed on an opposite side to the coil with respect to the second magnetic member, in the axis direction. The third magnetic member is larger in magnetic anisotropy
(Continued)

than each of the first magnetic member and the second magnetic member, and has an easy direction of magnetization oriented perpendicular to the axis direction.

7 Claims, 16 Drawing Sheets

(51) Int. Cl.
*H01F 17/04* (2006.01)
*H01F 27/255* (2006.01)

(58) Field of Classification Search
USPC .......................................... 336/200, 232, 192
See application file for complete search history.

(56) References Cited

U.S. PATENT DOCUMENTS

| | | | | |
|---|---|---|---|---|
| 2010/0308949 | A1 | 12/2010 | Lim et al. | |
| 2018/0218817 | A1* | 8/2018 | Kobayashi | H01F 27/2455 |
| 2019/0096566 | A1* | 3/2019 | Odahara | H01F 27/292 |

FOREIGN PATENT DOCUMENTS

| | | | |
|---|---|---|---|
| JP | 2011-504662 | A | 2/2011 |
| JP | 2018-125527 | A | 8/2018 |

* cited by examiner

MAGNETIC COMPONENT AND ELECTRIC DEVICE

CROSS-REFERENCE OF RELATED APPLICATIONS

This application is the U.S. National Phase under 35 U.S.C. § 371 of International Patent Application No. PCT/JP2021/004046, filed on Feb. 4, 2021, which in turn claims the benefit of Japanese Patent Application No. 2020-030919, filed on Feb. 26, 2020, the entire disclosures of which Applications are incorporated by reference herein.

TECHNICAL FIELD

The present disclosure relates to a magnetic component to be used with a coil, and an electric device including the magnetic component.

BACKGROUND ART

Patent Literature 1 discloses a coil element. The coil element is a laminated inductor, for example. The coil element includes a coil conductor, an isotropic magnetic material layer, an anisotropic magnetic material layer, and a core portion.

The isotropic magnetic material layer is provided on at least one of an upper surface and a lower surface of the coil conductor. The anisotropic magnetic material layer is provided on an opposite surface of the isotropic magnetic material layer to the coil conductor. The anisotropic magnetic material layer is made of first anisotropic magnetic material having an easy direction of magnetization oriented perpendicular to a laminated direction of the isotropic magnetic material layer and the anisotropic magnetic material layer. The core portion is provided inside the coil conductor. The core portion is made of second anisotropic magnetic material having an easy direction of magnetization oriented parallel to the laminated direction of the isotropic magnetic material layer and the anisotropic magnetic material layer.

CITATION LIST

Patent Literature

Patent Literature 1: JP 2018-125527 A

SUMMARY OF INVENTION

A magnetic component is configured to be used with a coil wound about a center axis along an axis direction. The magnetic component includes first to third magnetic members. The first magnetic member is configured such that magnetic flux generated by the coil passes through the first magnetic member. The first magnetic member extends in the axis direction to have a first end and a second end in the axis direction. The first magnetic member has a portion overlapping with the coil when viewed in a direction perpendicular to the axis direction. The second magnetic member is disposed on an opposite side to the coil with respect to the first end of the first magnetic member, in the axis direction. The third magnetic member is disposed on an opposite side to the coil with respect to the second magnetic member, in the axis direction. The third magnetic member is larger in magnetic anisotropy than each of the first magnetic member and the second magnetic member. The third magnetic member has an easy direction of magnetization along which the third magnetic member is easily magnetized compared to other directions. The easy direction of magnetization of the third magnetic member is oriented perpendicular to the axis direction.

The magnetic component can contribute to reduce magnetic loss.

DESCRIPTION OF EMBODIMENTS

A magnetic component and an electric device according to an embodiment is described with reference to the attached drawings. Note that the embodiment described below is mere an example of various embodiments of the present disclosure. Various modifications may be made to the following embodiment depending on design and the like as long as the object of the present disclosure is achieved. The drawings to be referred to in the following description of the embodiment are all schematic representations. The ratio of the dimensions (including thicknesses) of respective constituent elements illustrated on the drawings does not always reflect their actual dimensional ratio.

(1) Overview

Figure 1A:
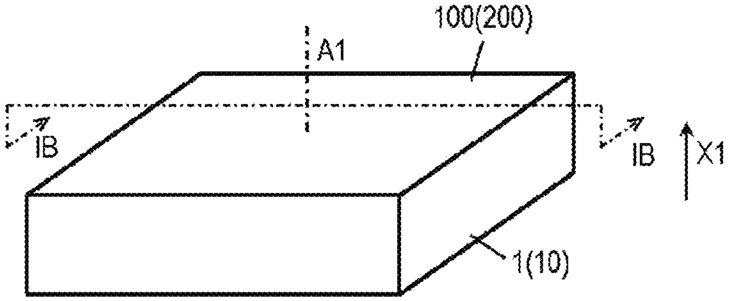
FIG. 1A is a perspective view illustrating an electric device according to an embodiment.
Figure 1B:
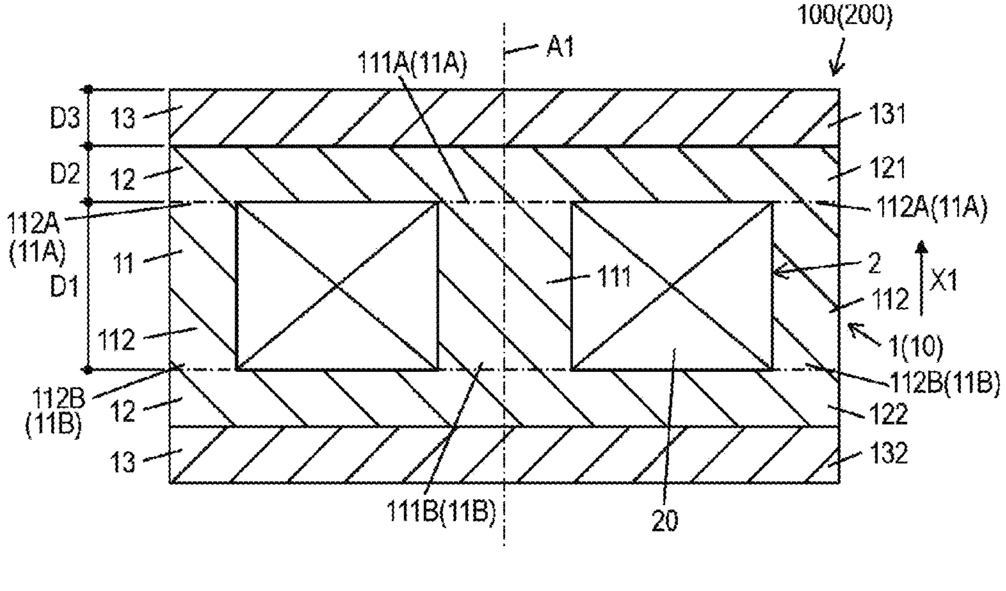
FIG. 1B is a cross section of the electric device taken along a line 1B-1B of FIG. 1A.

FIG. 1A is a perspective view of an electric device 100 according to an embodiment. FIG. 1B is a cross section of the electric device 100 taken along a line 1B-1B of FIG. 1A. The electric device 100 includes a magnetic component 1 and a coil 2.

Figure 2:
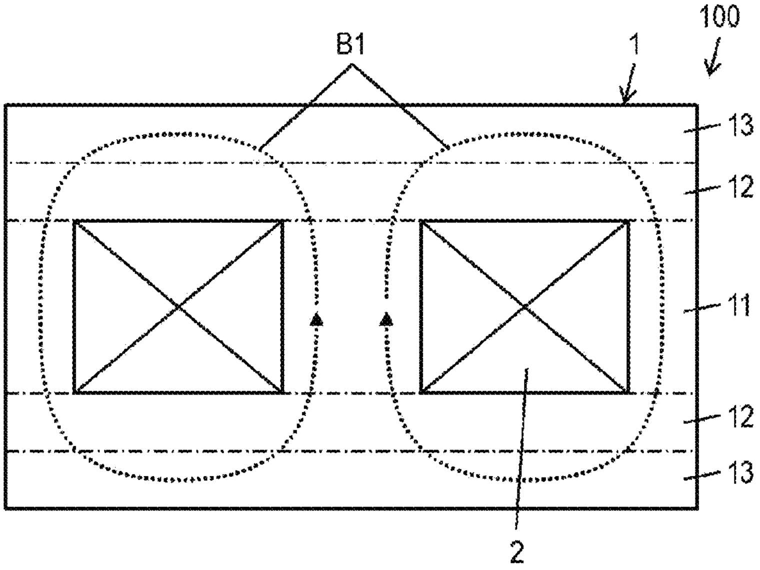
FIG. 2 illustrates magnetic flux generated in the electric device according to the embodiment.
Figure 3:
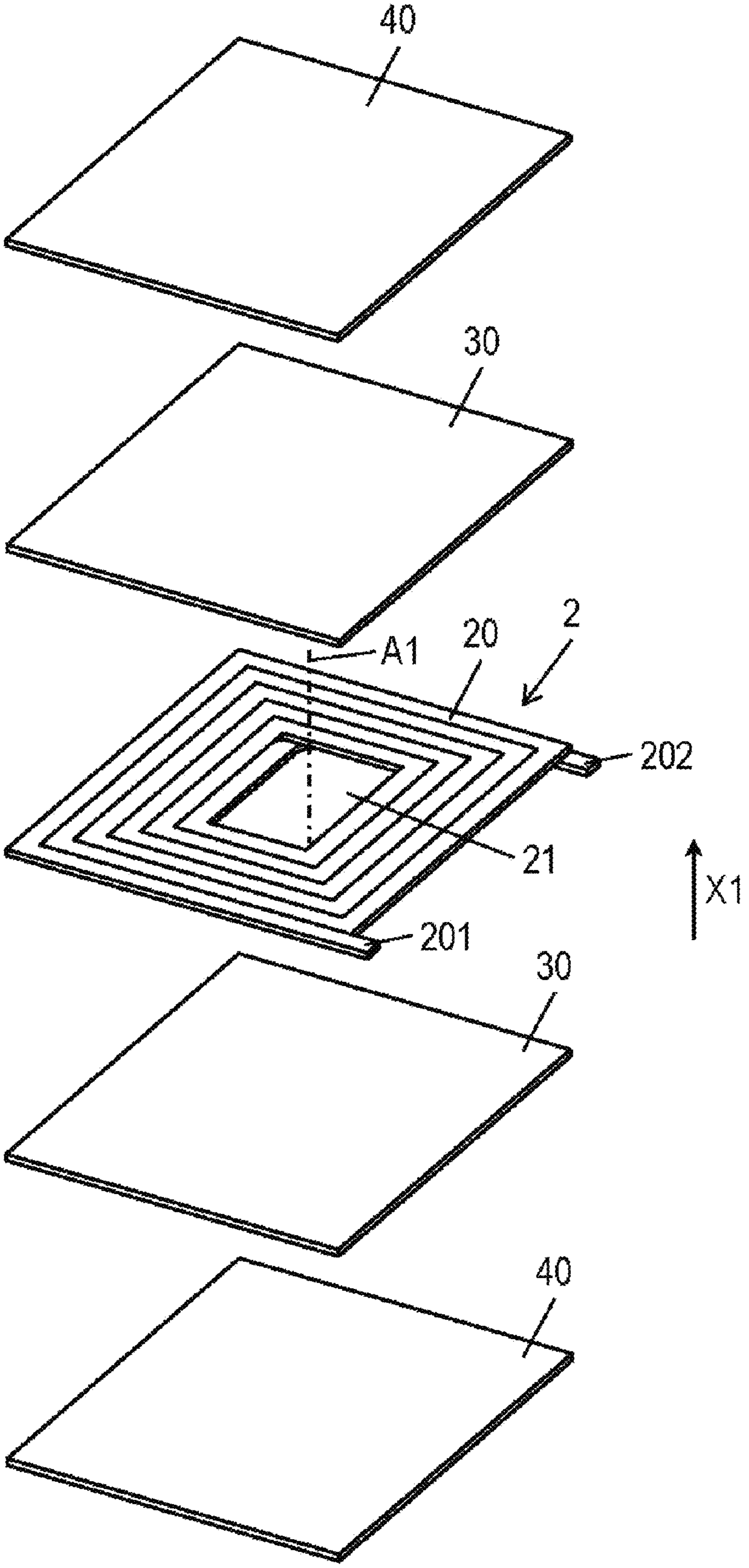
FIG. 3 illustrates a producing method of the electric device according to the embodiment.

FIG. 2 illustrates magnetic flux generated in the electric device 100. FIG. 3 illustrates a producing method of the electric device 100. The coil 2 includes a winding wire 20 wound about a virtual center axis A1 along an axis direction X1. The coil 2 is wound surrounding an internal space 21 through which the center axis A1 passes.

The magnetic component 1 includes a magnetic member 11, a magnetic member(s) 12 (121, 122), and a magnetic member(s) 13 (131, 132). Each of the magnetic members 11 to 13 is made of magnetic material.

The magnetic member 11 is disposed at the same layer as the coil 2, in the axis direction X1. That is, the magnetic member 11 has a portion overlapping with the coil 2 when viewed in a direction perpendicular to the axis direction X1. The magnetic member 11 includes a portion 111 running in the internal space 21 surrounded by the coil 2, and a portion 112 located outside the coil 2. Each of the portions 111 and 112 has a portion overlapping with the coil 2 when viewed in the direction perpendicular to the axis direction X1.

In the axis direction X1, the magnetic member 12 is located outside the coil 2 and outside the magnetic member 11. The magnetic member 12 covers an outer face in the axis direction X1 of the coil 2, i.e., a face, intersecting with the axis direction X1, of the coil 2.

In the axis direction X1, the magnetic member 13 is located outside the magnetic member 12. The magnetic member 13 covers an outer face in the axis direction X1 of the magnetic member 12, i.e., a face, away from the coil 2, of the magnetic member 12. In the axis direction X1, the magnetic member 12 is located between the coil 2 and the magnetic member 13. In the axis direction X1, the magnetic member 12 is located between the magnetic member 11 and the magnetic member 13.

The magnetic member 13 is larger in magnetic anisotropy than each of the magnetic member 11 and the magnetic member 12. Permeability of a magnetic member with magnetic anisotropy differs depending on the direction of magnetic flux passing through the magnetic member. Magnitude of magnetic anisotropy of a magnetic member is represented by a ratio of a maximum value to a minimum value, of permeability of the magnetic member, among values of permeability considered for every directions of magnetic flux passing through the magnetic member, for example. The larger ratio indicates the larger magnitude of magnetic anisotropy. The magnetic member 13 has an easy direction of magnetization along which the magnetic member 13 is easily magnetized compared to other directions. Either one or both of the magnetic members 11 and 12 may have an easy direction of magnetization along which it is easily magnetized compared to other directions. The magnetic member 13 is noticeable in the directionality of the easy direction of magnetization compared to the magnetic members 11 and 12.

In the magnetic component 1, the easy direction of magnetization of the magnetic member 13 is oriented perpendicular to the axis direction X1.

According to the magnetic component 1 and the electric device 100 of the present embodiment, a current flowing through the coil 2 generates magnetic flux B1 that passes from the portion 111 of the magnetic member 11 located on the center side, through the magnetic member 12 (121) located on the upper side, the magnetic member 13 (131) located on the upper side, the portion 112 of the magnetic member 11 located on the outer side, the magnetic member 12 (122) located on the lower side, the magnetic member 13 (132) located on the lower side, and the magnetic member 12 (122) located on the lower side, to the portion 111 of the magnetic member 11 located on the center side, as shown in FIG. 2. In the magnetic member 13, the magnetic flux B1 is oriented to a direction substantially perpendicular to the axis direction X1. The easy direction of magnetization of the magnetic member 13 is oriented perpendicular to the axis direction X1 as described above. In the magnetic member 13, therefore, the direction of the magnetic flux B1 generated by the current flowing through the coil 2 matches the easy direction of magnetization thereof. This can contribute to increase the effective magnetic permeability of the magnetic member 13 and thus increase the inductance of the magnetic component 1.

The magnetic anisotropy of the magnetic member 11 is smaller than the magnetic anisotropy of the magnetic member 13, and also the magnetic anisotropy of the magnetic member 12 is smaller than the magnetic anisotropy of the magnetic member 13. The magnetic flux B1 generated by the current flowing the coil 2 is therefore less likely to be affected by the easy direction of magnetization of the magnetic member in both of the magnetic member 11 and the magnetic member 12. In the magnetic component 1, therefore, the situation is less likely to occur that the direction of the magnetic flux B1 is largely changed around the boundary between the magnetic member 11 and the magnetic member 12 due to the influence of the easy direction of magnetization of the magnetic member. This can facilitate to uniformize the magnetic flux density in the magnetic member 11 of the magnetic component 1. As a result, the magnetic component 1 can contribute to reduce the magnetic loss.

(2) Details

The magnetic component 1 and the electric device 100 according to the present embodiment will be described in detail with reference to the drawings. The electric device 100 of the present embodiment is so-called an inductor 200, including: a core 10 as the magnetic component 1; and the coil 2.

(2.1) Configuration of Electric Device 100

The inductor 200 as the electric device 100 includes the coil 2 and the core 10. The inductor 200 in the embodiment is a metal composite inductor where the coil 2 and the core 10 containing magnetic metal powder are integrally molded together. That is, the core 10 (magnetic component 1) is a molded article integrally molded with the coil 2 such that the coil 2 is built therein. Therefore, the inductor 200 includes the core 10 that is a gapless core. As shown in FIG. 1B, the inductor 200 has no gap between the coil 2 and the core 10.

As shown in FIG. 3, the coil 2 is formed of the winding wire 20 having a rectangular cross section and wound around the virtual center axis A1. The winding wire 20 is, for example, a flat conductor with an insulation coating. The coil 2 includes an electrode 201 and another electrode 202 configured to be electrically connected to an external power supply. The electrode 201 and the electrode 202 are provided at one end and the other end of the winding wire 20, respectively. Material of the conductor may be cupper, for example. The winding wire 20 is wound in a plane around the center axis A1 so that its diameter decreases gradually like a spiral from the electrode 201 to form a first layer. The winding wire 20 then rises (or falls) in the axis direction X1, which is a thickness direction thereof, at the minimum diameter portion of the first layer to form a step. The winding wire 20 is then wound in another plane so that its diameter increases gradually like a spiral to form a second layer, and is connected to the electrode 202. That is, the coil 2 includes the winding wire 20 having a spiral shape. The winding wire 20 having the spiral shape can contribute to reduce the height of the electric device 100 (inductor 200) including the coil 2.

The coil 2 has, in its center, a space 21 at which there is no winding wire 20 but through which the center axis A1 passes.

When the electrodes 201 and 202 are connected to the external power supply, the power supply applies a voltage across the electrodes 201 and 202 to cause a current to flow through the coil 2. The current flowing through the coil 2 generates a magnetic filed around the coil 2.

As shown in FIG. 1B, the core 10 includes the magnetic member 11, the magnetic member(s) 12 (121, 122), and the magnetic member(s) 13 (131, 132).

As described above, the magnetic member 11 is located in the same layer as the coil 2 in the axis direction X1. In the present disclosure, "the same layer as the coil 2" indicates that it is located in the same plane as the coil 2 when viewed in the direction perpendicular to the axis direction X1. The magnetic member 11 includes the portion 111 disposed on the inner side of the coil in the direction perpendicular to the axis direction X1. The portion 111 is a part of the magnetic member 11, and the winding wire 20 of the coil 2 is wound around the portion 111. The magnetic member 11 further includes the portion 112 disposed on the outer side of the coil 2 in the direction perpendicular to the axis direction X1. The portion 112 is a part of the magnetic member 11, and is disposed on the outer side of the winding wire 20 of the coil 2 when viewed in the axis direction X1. The portion 112 has a rectangular column shape, for example. The magnetic member 11 extends in the axis direction X1, and has first and second ends 11A, 11B in the axis direction X1 at opposite ends thereof. The portion 111 of the magnetic member 11 extends in the axis direction X1, and has first and second ends 111A, 111B in the axis direction X1 at opposite ends thereof. The portion 112 of the magnetic member 11 extends in the axis direction X1, and has first and second ends 112A, 112B in the axis direction X1 at opposite ends thereof. The ends 111A, 112A of the portions 111, 112 of the magnetic member 11 constitute the end 11A of the magnetic member 11. The ends 111B, 112B of the portions 111, 112 of the magnetic member 11 constitute the end 11B of the magnetic member 11.

The magnetic member 11 has a thickness D1 along the axis direction X1.

As described above, the magnetic member(s) 12 (121, 122) is disposed on the outer side of the coil 2 and the outer side of the magnetic member 11 in the axis direction X1. The magnetic member 12 is located at the different layer from the magnetic member 11, in the axis direction X1. The magnetic member 121 is disposed on one side in the axis direction X1 (upper side in FIG. 1B) and covers an outer face (upper face in FIG. 1B) of the coil 2 and an outer face of the magnetic member 11. The magnetic member 122 is disposed on the other side in the axis direction X1 (lower side in FIG. 1B) and covers an outer face (lower face in FIG. 1B) of the coil 2 and an outer face of the magnetic member 11. Therefore, the magnetic member 12 covers both of the outer faces of the coil 2 in the axis direction X1. The magnetic member 121 is directly connected to the end 11A of the magnetic member 11, in the embodiment, to the ends 111A, 112A of the portions 111, 112 of the magnetic member 11. The magnetic member 122 is directly connected to the end 11B of the magnetic member 11, in the embodiment, to the ends 111B, 112B of the portions 111, 112 of the magnetic member 11.

The magnetic member 12 has a thickness D2 along the axis direction X1. The magnetic members 121, 122 of the magnetic member 12 have the same thickness D2 as each other.

As described above, the magnetic member(s) 13 (131, 132) is disposed on the outer side of the magnetic member 12, in the axis direction X1. The magnetic member 13 is disposed at the different layer from each of the magnetic member 11 and the magnetic member 12, in the axis direction X1. The magnetic member 131 is disposed on one side in the axis direction X1 (upper side in FIG. 1B) and covers an outer face (upper face in FIG. 1B) of the magnetic member 12 (portion 121). The magnetic member 132 is disposed on the other side in the axis direction X1 (lower side in FIG. 1B) and covers an outer face (lower face in FIG. 1B) of the magnetic member 12 (122). The magnetic member 13 constitutes an outermost layer of the magnetic component 1, in the axis direction X1. The magnetic member 131 is directly connected to the magnetic member 121. The magnetic member 132 is directly connected to the magnetic member 122.

The magnetic member 13 has a thickness D3 along the axis direction X1. The magnetic members 131, 132 have the same thickness D3 as each other.

The magnetic members 11 to 13 have substantially the same outer peripheral shape as each other when viewed in the axis direction X1.

The magnetic member 11 is made of isotropic magnetic material. The magnetic member 12 is made of isotropic magnetic material. In the present embodiment, the magnetic members 11, 12 are made of the same material (isotropic magnetic material).

Figure 4:
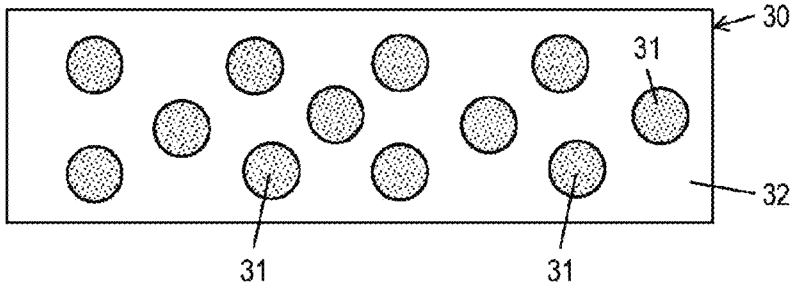
FIG. 4 illustrates material to be used for the producing method of the electric device according to the embodiment.

FIG. 4 is a schematic cross section of the isotropic magnetic material that forms the magnetic members 11, 12. The isotropic magnetic material is composite material containing a spherical magnetic metal powder 31 and a resin 32. The composite material containing the magnetic metal powder 31 and the resin 32 is formed into a sheet shape such that the magnetic metal powder 31 is distributed substantially uniformly in the resin 32, for example, thereby forming an isotropic magnetic sheet 30. In the isotropic magnetic sheet 30 shown in FIG. 4, the spherical magnetic metal powder 31 is uniformly distributed, which can provide isotropic magnetic permeability.

On the other hand, the magnetic member 13 is made of anisotropic magnetic material.

Figure 5:
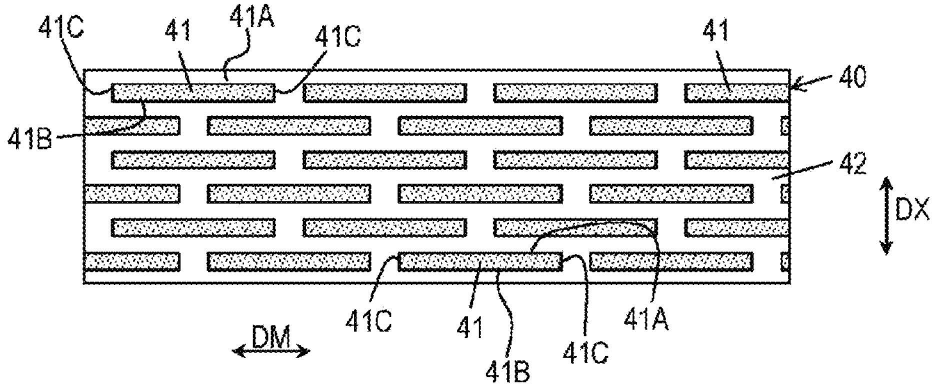
FIG. 5 illustrates material to be used for the producing method of the electric device according to the embodiment.

FIG. 5 is a schematic cross section of the anisotropic magnetic material that forms the magnetic member 13. The anisotropic magnetic material is composite material containing a flat magnetic metal powder 41 and a resin 42. The grain of the magnetic metal powder 41 has a metal foil shape having faces 41A, 41B at opposite ends in a direction DX and having an end face 41C connecting outer peripheries of the faces 41A, 41B. The grain of the magnetic metal powder 41 has a thickness of about 1 μm, along the direction DX, for example. The grain of the magnetic metal powder 41 has an aspect ratio, which indicates a ratio of a width along a direction DM perpendicular to the direction DX to the thickness along the direction DX, of greater than or equal to 20. The composite material containing the magnetic metal powder 41 and the resin 42 is formed into a sheet shape where the grains of the magnetic metal powder 41 are oriented such that the faces 41A, 41B of the grains of the magnetic metal powder 41 face in the direction DX, thereby forming an anisotropic magnetic sheet 40. The anisotropic magnetic sheet 40 has a large magnetic anisotropy. The anisotropic magnetic sheet 40 has an easy direction of magnetization, which extends along a direction contained in a plane including the direction DM and which is perpendicular to the direction DX.

The inductor 200 can be made by laminating and press-molding the above described coil 2, isotropic magnetic sheet 30 and anisotropic magnetic sheet 40. An example of a producing method of the inductor 200 will be described later.

The inductor 200 may further includes a housing in which the core 10 and the coil 2 are housed. The electrodes 201 and 202 may be held by the housing so that they are exposed outside the housing, for example.

It is explained advantages of the magnetic component 1 (core 10) including the magnetic members 11 to 13.

Figure 6A:
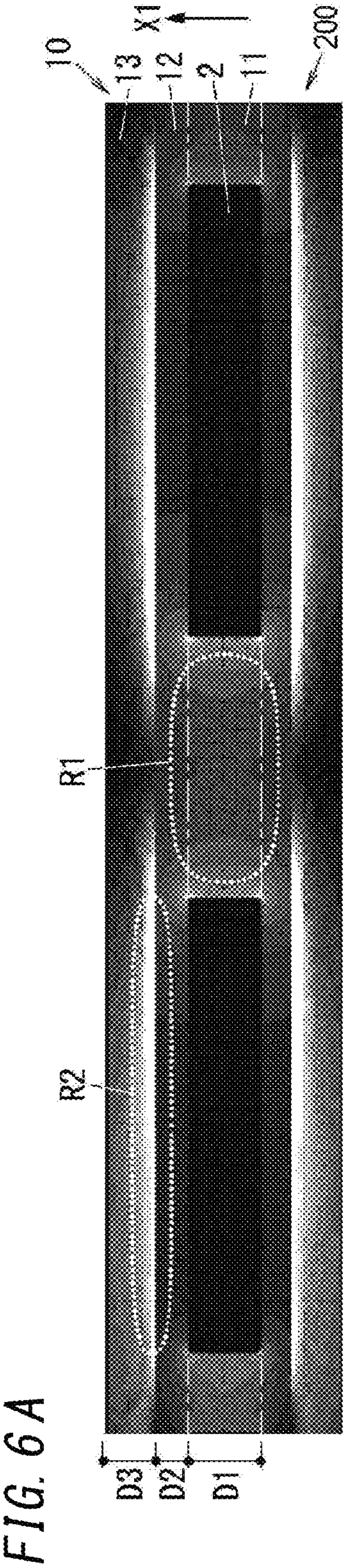
FIG. 6A illustrates a result of simulation of intensity distribution of magnetic flux density inside a magnetic component of an electric device of a comparative example.
Figure 6B:
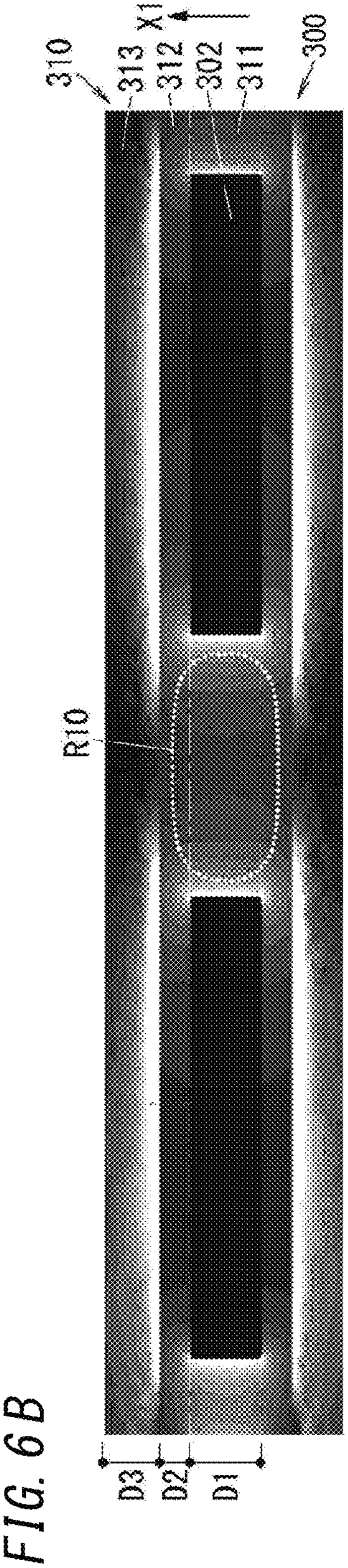
FIG. 6B illustrates a result of simulation of intensity distribution of magnetic flux density inside a magnetic component of an electric device of a comparative example.

FIG. 6A illustrates a result of a simulation of intensity distribution of magnetic flux density inside the core 10 of the inductor 200 according to the present embodiment. FIG. 6A illustrates a result of a simulation of intensity distribution of magnetic flux density inside a core 310 of an inductor 300 according to a comparative example. FIGS. 6A and 6B each show the intensity of the magnetic flux density with a grayscale where the color approaches white as the intensity of the magnetic flux density increases. In FIGS. 6A and 6B, the blackest colored region represents the coil 2.

As described above, according to the inductor 200 of the present embodiment, the magnetic member 11 and the magnetic member 12 are made of the isotropic magnetic material, while the magnetic member 13 is made of the anisotropic magnetic material.

As to the parameters for the simulation for FIG. 6A, the relative magnetic permeability of the magnetic member 11 and the magnetic member 12 is set to 30. The relative magnetic permeability of the magnetic member 13 along the axis direction X1, which corresponds to the thickness direction of the magnetic member 13, is set to 2. The relative magnetic permeability of the magnetic member 13 along the direction perpendicular to the axis direction X1, which corresponds to the lengthwise direction of the magnetic member 13, is set to 200. In the simulation for FIG. 6A, a ratio of the thickness D2 of the magnetic member 12 to a total of the thickness D2 of the magnetic member 12 and the thickness D3 of the magnetic member 13 is set to 0.4.

The inductor 300 of the comparative example includes a coil 302 and magnetic members 311, 312, 313, which have the same geometric structure as the coil 2 and the magnetic members 11, 12, 13 of the inductor 200 of the embodiment, respectively. The coil 302 and the magnetic members 312, 313 of the inductor 300 of the comparative example are the same as the coil 2 and the magnetic members 12, 13 of the inductor 200 of the embodiment also in terms of their materials and the like, respectively. However, the magnetic member 311 of the inductor 300 of the comparative example is made of anisotropic magnetic material, and has an easy direction of magnetization oriented along the axis direction X1.

As to the parameters for the simulation for FIG. 6B, the relative magnetic permeability of the magnetic member 312 is set to 30. The relative magnetic permeability of the magnetic member 313 along the axis direction X1, which corresponds to the thickness direction of the magnetic member 313, is set to 2. The relative magnetic permeability of the magnetic member 313 along the direction perpendicular to the axis direction X1, which corresponds to the lengthwise direction of the magnetic member 313, is set to 200. In the simulation for FIG. 6B, the relative magnetic permeability of the magnetic member 311 along the axis direction X1, which corresponds to the thickness direction of the magnetic member 311, is set to 200. The relative magnetic permeability of the magnetic member 311 along the direction perpendicular to the axis direction X1, which corresponds to the lengthwise direction of the magnetic member 311, is set to 2. In the simulation for FIG. 6B, in similar to the case of FIG. 6A, a ratio of the thickness D2 of the magnetic member 312 to a total of the thickness D2 of the magnetic member 312 and the thickness D3 of the magnetic member 313 is set to 0.4.

As shown in FIG. 6B, the inductor 300 of the comparative example has, in a center region R10 of the magnetic member 311, a boundary between a portion having a comparatively large intensity of magnetic flux density and a portion having a comparatively small intensity of magnetic flux density, and the boundary extends substantially along the axis direction X1. On the other hand, the inductor 200 of the present embodiment has a portion having a comparatively larger intensity of magnetic flux density in a region R1 of the portion 111 of the magnetic member 11, and the portion spreads to the approximately center of the region R1. Furthermore, the magnetic member 13 of the inductor 200 of the present embodiment has a portion with the largest intensity of magnetic flux density (a portion with a brightest color) in a region R2 near a boundary with respect to the magnetic member 12, but the area of this portion is smaller than that for the inductor 300 of the comparative example.

As can be seen from FIGS. 6A and 6B, in the inductor 300 of the comparative example, the portion with a comparatively large intensity of magnetic flux density is concentrated in a region near the coil 2 of the core 10, compared to the inductor 200 of the present embodiment. In other words, in the inductor 200 of the present embodiment, the intensity of magnetic flux density is uniformized in the core, compared to the inductor 300 of the comparative example. It is known that magnetic loss of an inductor tends to increase according to the intensity of magnetic flux density in the core. This means that uniformizing the magnetic flux density will reduce the magnetic loss. Consequently, the inductor 200 of the present embodiment can reduce the magnetic loss compared to the inductor 300 of the comparative example.

Furthermore, the inductor 200 of the present embodiment satisfies a first condition and a second condition described below.

The first condition includes that, in the axis direction X1, the dimension D2 of the magnetic member 12 falls within a range of 30% to 65% of a total of the dimension D2 of the magnetic member 12 and the dimension D3 of the magnetic member 13.

The first condition is represented by the following Eq. 1.

$$0.3<D2/(D2+D3)<0.65 \quad \text{(Eq. 1)}$$

The second condition includes that, in the axis direction X1, the dimension D1 of the magnetic member 11 falls within a range of 50% to 100% of a total of the dimension D2 of the magnetic member 12 (magnetic member 121, for example) and the dimension D3 of the magnetic member 13 (magnetic member 131, for example) which are located on one side with respect to the coil 2.

The second condition is represented by the following Eq. 2.

$$0.5<D1/(D2+D3)<1 \quad \text{(Eq. 2)}$$

Satisfying the Eq. 1 and the Eq. 2 can increase the inductance of the inductor 200 with the magnetic loss reduced as described later.

(2.2) Producing Method

A producing method of the inductor 200 of the present embodiment is described with reference to FIG. 3 and FIG. 7. In this example, the inductor 200 can be produced according to a sheet molding method.

Figure 7:
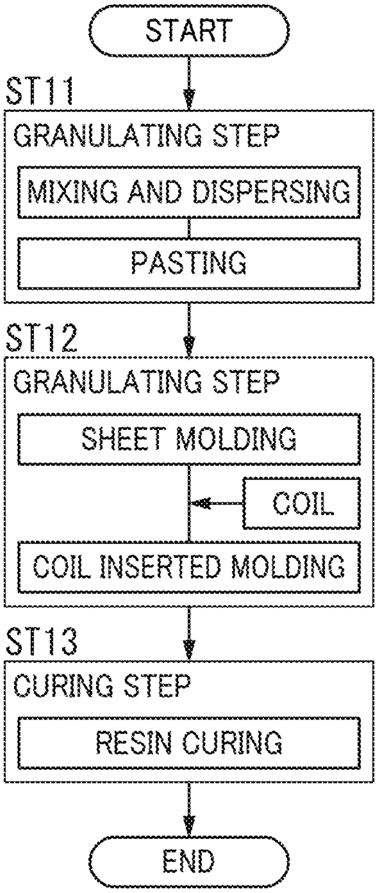
FIG. 7 illustrates a flowchart of a producing method of the electric device according to the embodiment.

FIG. 7 is a flowchart showing steps of the sheet molding method as an example of the producing method of the inductor 200 of the present embodiment. The sheet molding method includes a granulating step ST11, a molding step ST12, and a curing step ST13.

The granulating step ST11 includes preparing the isotropic magnetic material as a basis of the magnetic members 11, 12 and preparing the anisotropic magnetic material as a basis of the magnetic member 13, which are to be formed into the core 10.

Raw materials of the isotropic magnetic material and the anisotropic magnetic material include the magnetic metal powders 31, 41 and the resins 32, 42, as described above. Materials of the magnetic metal powders 31, 41 are not particularly limited, but may be magnetic metals selected from the group consisting of Fe—Si—Al based alloy, Fe—Si based alloy, Fe—Si—Cr based alloy, Fe—Ni based alloy, amorphous alloy, and nanocrystalline alloy, for example. The resins 32, 42 may be thermosetting resin, for example. Materials of the resins 32, 42 are not particularly limited, but may be selected from the group consisting of epoxy resin, phenol resin, and silicone resin, for example.

The raw materials of the isotropic magnetic material and the anisotropic magnetic material may optionally includes at least one of inorganic insulating material or additive. The inorganic insulating material may be powder, and contribute to reduce the contact possibility between the grains of the magnetic metal powder 31 or 41, thereby suppressing the increase in the eddy-current loss, for example. Presence of the inorganic insulating material between the grains of the magnetic metal powder 31 or 41 can provide electrical insulation between the grains of the magnetic metal powder 31 or 41. This can reduce the size of a conductor within which the eddy current is induced. Material of the inorganic insulating material is not particularly limited, but may be selected from the group consisting of boron nitride, talc, mica, zinc oxide, titanium oxide, silicon oxide, aluminum oxide, iron oxide, and barium sulfate, for example. The additive contribute to increase the dispersity of the magnetic metal powder 31 or 41 and modify the surfaces of the grains of the magnetic metal powder 31 or 41, for example. The additive is not particularly limited, but may be selected from the group consisting of silane coupling agent, titanium based coupling agent, titanium alkoxide, and titanium chelate, for example.

The granulating step ST11 includes mixing and dispersing each other the magnetic metal powder 31 and the inorganic insulating material to prepare a mixed powder (Mixing and Dispersing). The step includes mixing the resin 32 and the additive with the mixed powder thus obtained and kneading them to prepare a paste-like granular powder (Pasting). The step includes mixing and dispersing each other the magnetic metal powder 41 and the inorganic insulating material to prepare a mixed powder. The step includes mixing the resin 42 and the additive with the mixed powder thus obtained and kneading them to prepare a paste-like granular powder.

Apparatuses and/or methods for the granulating step ST11 is not particularly limited. It can use various apparatuses including various ball mills such as rotary ball mills and planetary ball mills, V type blenders, and planetary mixers, for example. In the granulating step ST11, organic solvent such as toluene and ethanol may be mixed if necessary. The resin 32 and the additive may be added at the same time while the magnetic metal powder 31 and the inorganic insulating material are mixed and dispersed. Also, the resin 42 and the additive may be added at the same time while the magnetic metal powder 41 and the inorganic insulating material are mixed and dispersed.

The molding step ST12 includes molding the obtained granular powders into sheet shapes to form the isotropic magnetic sheet 30 and the anisotropic magnetic sheet 40 (Sheet Molding). Apparatuses and/or methods for the molding step ST12 is not particularly limited. It can use a doctor blade type sheet molding machine, extrusion molding machine, and the like, for example. The isotropic magnetic sheet 30 and/or the anisotropic magnetic sheet 40 may be formed by shaping the granular powder into a molded body with a sheet shape, and if necessary cutting the unnecessary portion out by a clicker cutter for example to have a desired shape and dimension.

The isotropic magnetic sheet 30 exhibits the isotropic magnetic permeability as described above. On the other hand, the anisotropic magnetic sheet 40 has the easy direction of magnetization oriented along a surface of the anisotropic magnetic sheet 40, i.e., along the direction DM perpendicular to the thickness direction DX (see FIG. 5).

The molding step ST12 includes laminating an anisotropic magnetic sheet 40, an isotropic magnetic sheet 30, the coil 2, another isotropic magnetic sheet 30, and another anisotropic magnetic sheet 40 one on top the other in this order from the bottom as shown in FIG. 3, and press-molding the laminate to produce a coil inserted molded body. Apparatuses and/or methods for the press-molding process is not particularly limited, but a commonly used press-molding method can be employed.

During the press-molding process, the isotropic magnetic sheets 30 are disposed on the upper side and the lower side of the coil 2, and center portions of both of the isotropic magnetic sheets 30 enter into the internal space 21 present in the center of the coil 2, and peripheral portions of both of the isotropic magnetic sheets 30 enter into the space outside the coil 2. The portions, entered into the internal space 21, of the isotropic magnetic sheets 30 are formed into the portion 111 of the magnetic member 11. Also, the portions, entered into the space outside the coil 2, of the isotropic magnetic sheets 30 are formed into the portion 112 of the magnetic member 11. The isotropic magnetic sheet 30 may be produced to have a shape having a protrusion(s) at a region corresponding to at least part of the portion 111 and/or the portion 112 of the magnetic member 11, when the isotropic magnetic sheet 30 is prepared.

The portions, located on the outer side (upper side and lower side) of the coil 2 in the axis direction X1, of the isotropic magnetic sheets 30 are formed into the magnetic member 12 of the magnetic component 1.

The anisotropic magnetic sheets 40 are formed into the magnetic member 13 of the magnetic component 1.

The curing step ST13 includes heating at the temperature within a range of 150 C.° to 250 C.° the molded bodies obtained by the press-molding process, to cure the resins 32, 42 (thermosetting resin) contained in the isotropic magnetic sheets 30 and the anisotropic magnetic sheets 40 (Resin Curing).

The inductor 200 shown in FIGS. 1A and 1B can be formed according to the sheet molding method as described above.

Figure 8:
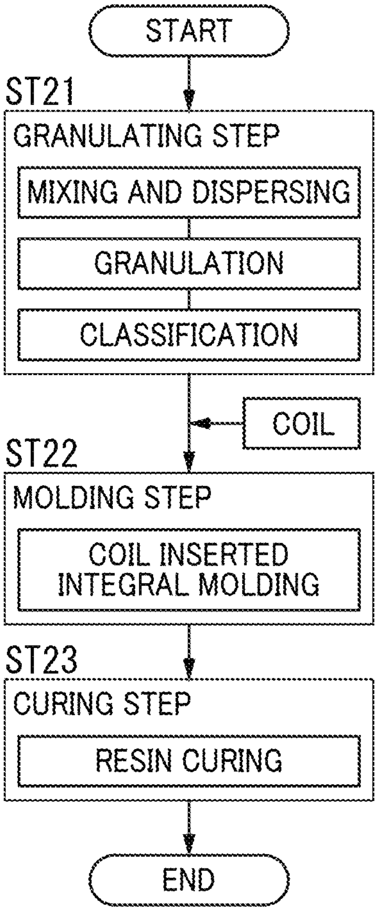
FIG. 8 illustrates a flowchart of another producing method of the electric device according to the embodiment.

The producing method of the inductor 200 is not limited to the sheet molding method. FIG. 8 is a flowchart showing steps of a granular molding method as another example of the producing method of the inductor 200 of the present embodiment.

As shown in FIG. 8, the granular molding method includes a granulating step ST21, a molding step ST22, and a curing step ST23.

The granulating step ST21 includes preparing the isotropic magnetic material as a basis of the magnetic members 11, 12 and preparing the anisotropic magnetic material as a basis of the magnetic member 13, which are to be formed into the core 10. Raw materials of the isotropic magnetic material and the anisotropic magnetic material may be the same as those described in the sheet molding method.

The granulating step ST21 includes mixing and dispersing each other the magnetic metal powder 31 and the inorganic insulating material to prepare a mixed powder (Mixing and Dispersing). The step includes mixing the resin 32 and the additive with the mixed powder thus obtained to prepare a granular powder (hereinafter, referred to as an "isotropic magnetic powder") (Granulation). The step includes mixing and dispersing each other the magnetic metal powder 41 and the inorganic insulating material to prepare a mixed powder. The step includes mixing the resin 42 and the additive with the mixed powder thus obtained to prepare a granular powder (hereinafter, referred to as an "anisotropic magnetic powder"). The granular powder(s) thus obtained may be classified according to their grain size in order to increase the fluidity of the granular powder (Classification). This allows the granular powder(s) to be surely filled within a mold, and thus can increase the formability. It should be noted that, in the granulating step ST21, the granular powder(s) is not formed into a paste-like state, contrary to the granulating step ST11.

The molding step ST22 includes putting the granular powder and the coil 2 in a mold such that the isotropic magnetic powder is present inside and around the coil 2, and press-molding them. The step includes arranging, on both sides (upper and lower sides) of isotropic magnetic bodies made of the isotropic magnetic powder in the axis direction X1 of the coil 2, anisotropic magnetic bodies made of the anisotropic magnetic powder. The step includes press-molding them to form a molded body (Coil Inserted Integral Molding). Apparatuses and/or methods for the press-molding process is not particularly limited, but a commonly used press-molding method can be employed.

The curing step ST23 includes heating the molded body obtained by the press-molding process to cure the resins 32, 42 (thermosetting resin) contained in the isotropic magnetic powder and the anisotropic magnetic powder (Resin Curing).

The inductor 200 shown in FIGS. 1A and 1B also can be formed according to the granular molding method as described above.

The core 10 of the inductor 200 made according to the sheet molding method or the granular molding method includes the magnetic members 11, 12 made of the isotropic magnetic material and the magnetic member 13 made of the anisotropic magnetic material. This can contribute to reduce the magnetic loss of the magnetic component 1. The core 10 of the inductor 200 made according to the sheet molding method or the granular molding method can provide a gapless structure where a gap is not present inside the core 10 nor a region between the core 10 and the coil 2.

(2.3) Thickness of Magnetic Member

The inventors of the present application have, after the earnest researches and studies, found a particular relation among the thickness D1 of the magnetic member 11, the thickness D2 of the magnetic member 12, and the thickness D3 of the magnetic member 13, which can increase the inductance of the magnetic component 1 with the magnetic loss reduced. Hereinafter explained is the relation among the thickness D1 of the magnetic member 11, the thickness D2 of the magnetic member 12, and the thickness D3 of the magnetic member 13.

The inventors of the present application firstly studied a value of a ratio P1 (=D2/(D2+D3)) of the thickness of the isotropic magnetic material (magnetic member 12) with respect to a total thickness of the magnetic member (magnetic member 12 and magnetic member 13) located on the outer side of the coil 2 (upper and lower sides of the coil 2).

For this consideration, the inventors of the present application conduct the simulation of the intensity distribution of the magnetic flux density inside the core 10 with various values of the ratio P1. As to the parameters for the simulation, in similar to the case of FIG. 6A, the relative magnetic permeability of the magnetic member 11 and the magnetic member 12 is set to 30, the relative magnetic permeability of the magnetic member 13 along the axis direction X1, which corresponds to the thickness direction of the magnetic member 13, is set to 2, and the relative magnetic permeability of the magnetic member 13 along the direction perpendicular to the axis direction X1, which corresponds to the lengthwise direction of the magnetic member13, is set to 200. In the simulation, a ratio of the thickness D1 of the magnetic member 11 to a total of the thickness D2 of the magnetic member 12 and the thickness D3 of the magnetic member 13 is set to 0.9 (D1/(D2+D3)=0.9).

Figure 9:
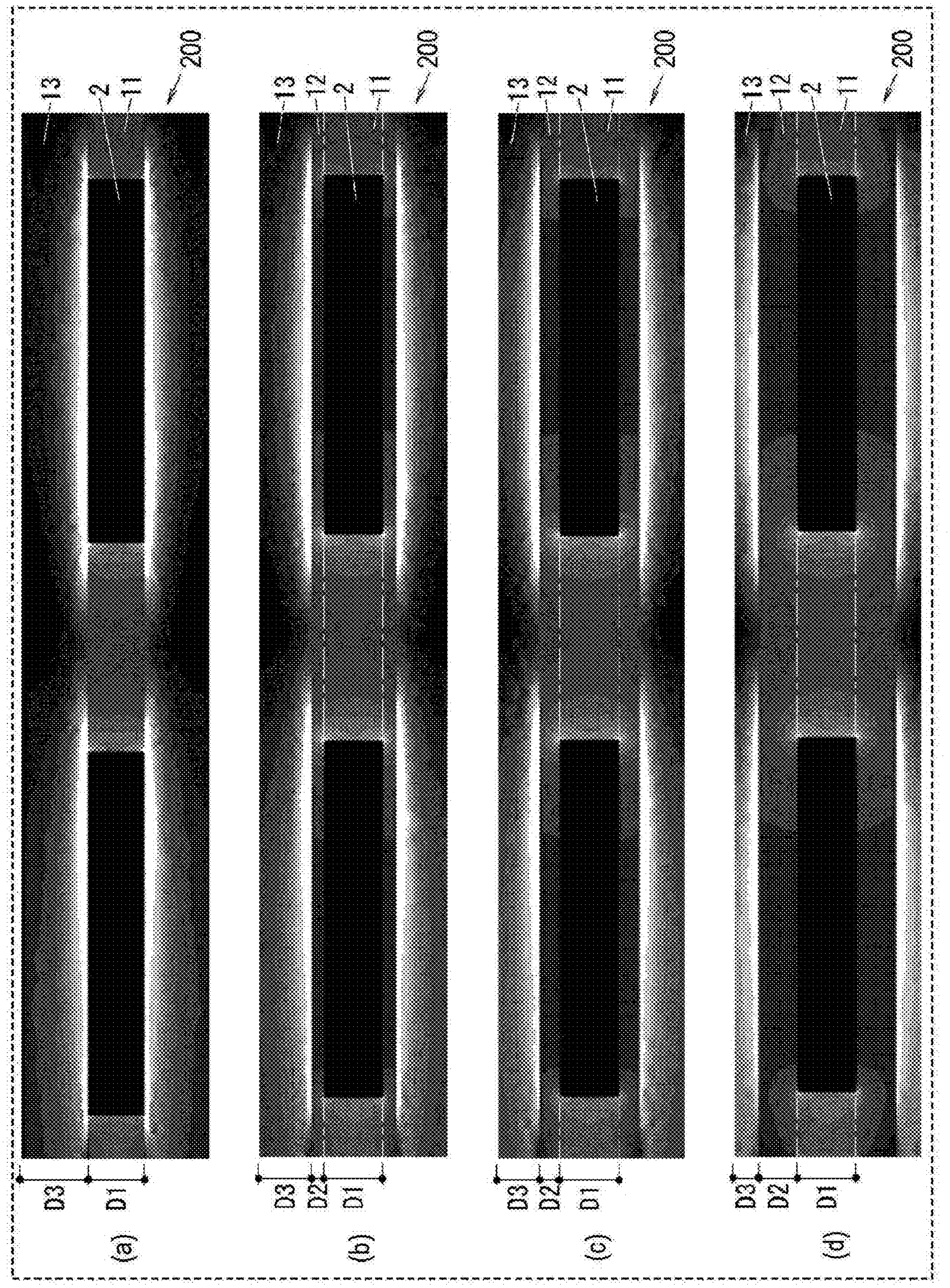
FIG. 9 illustrates results of simulation of intensity distribution of magnetic flux density inside magnetic components of electric devices according to the embodiment.
Figure 10:
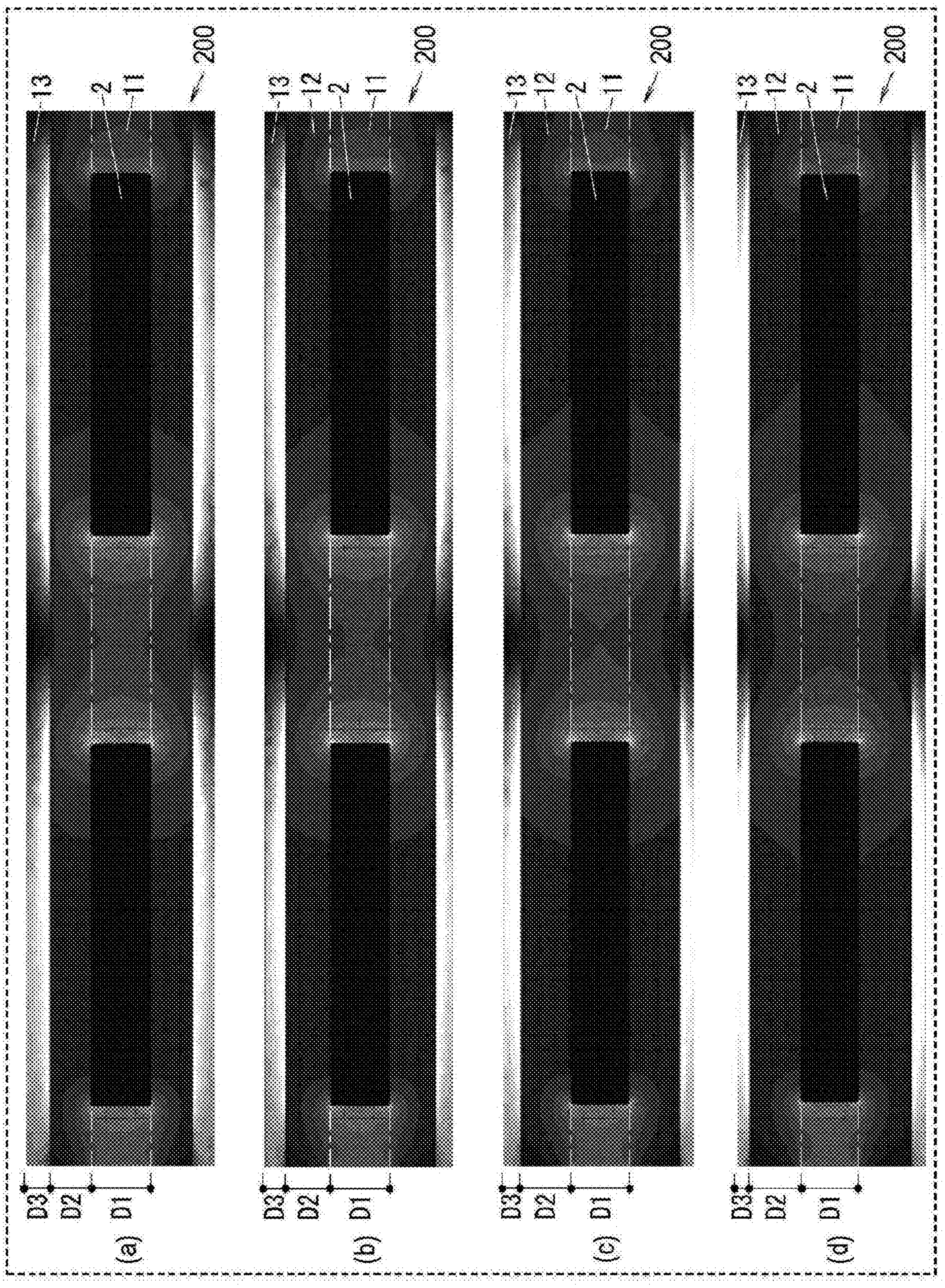
FIG. 10 illustrates results of simulation of distribution of magnetic flux density inside magnetic components of electric devices according to the embodiment.

FIGS. 9 and 10 illustrate results of the simulation. In similar to FIG. 6A, FIGS. 9 and 10 each show the intensity of the magnetic flux density with a grayscale where the color approaches white as the intensity of the magnetic flux density increases. In FIGS. 9 and 10, the blackest colored region represents the coil 2.

FIG. 9 of (a) illustrates a result of the simulation in a case of the ratio P1=0, FIG. 9 of (b) illustrates a result of the simulation in a case of the ratio P1=0.2, FIG. 9 of (c) illustrates a result of the simulation in a case of the ratio P1=0.3, and FIG. 9 of (d) illustrates a result of the simulation in a case of the ratio P1=0.6. FIG. 10 of (a) illustrates a result of the simulation in a case of the ratio P1=0.65, FIG. 10 of (b) illustrates a result of the simulation in a case of the ratio P1=0.7, FIG. 10 of (c) illustrates a result of the simulation in a case of the ratio P1=0.75, and FIG. 10 of (d) illustrates a result of the simulation in a case of the ratio P1=0.8. FIG. 6A corresponds to a case of the ratio P1=0.4.

As can be seen FIG. 9 of (a) to (c), the intensity distribution of the magnetic flux density inside the portion 111 of the magnetic member 11 is gradually uniformized while the ratio P1 increases from 0 to 0.3. As can be seen from FIG. 9 of (c), FIG. 6A, FIG. 9 of (d) and FIG. 10 of (a), the intensity distribution of the magnetic flux density inside the portion 111 of the magnetic member 11 is kept uniformized in a range where the ratio P1 varies from 0.3 to 0.65. As can be seen from FIG. 10, the uniformity of the intensity distribution of the magnetic flux density inside the portion 111 of the magnetic member 11 gradually decreases while the ratio P1 increase from 0.65 to 0.8.

In the case where the ratio P1 is 0 (i.e., the case where the inductor includes no magnetic member 12) and the cases where the ratio P1 is 0.7 or more, the magnetic member 13 has a portion having a very large intensity of the magnetic flux density near a boundary with respect to the magnetic member 12 (see, particularly, around the center).

Table 1 shows the inductance of the inductor 200 under various values of the ratio P1. In the table 1, the values of the inductance are normalized such that the value of the inductance of the inductor having the ratio P1 of 0 is set to 100. Therefore, it can be said that each of these values indicates a ratio of the inductance of a corresponding inductor to the inductance of the inductor having the ratio P1 of 0, expressed as a percentage. Table 1 also shows evaluation results for the inductance. The inductance is evaluated based on the comparison result with the inductor having no magnetic member 12 (the ratio P1=0). The inductor having a value of the inductance of 100 or less is classified as "bad" and labeled as "NG". The inductor having a value of the inductance of more than 100 is classified as "good" and labeled as "G". Table 1 also shows evaluation results for the uniformity of the magnetic flux with respect to the values of the ratio P1. For the evaluation of the uniformity of the magnetic flux, the distributions of the intensity were visually checked. The inductor with a high uniformity is classified as "good" and labeled as "G". The inductor with a low uniformity is classified as "bad" and labeled as "NG"

| Ratio | Inductance | | Uniformity of |
|---|---|---|---|
| P1 | | Evaluation result | Magnetic Flux |
| 0 | 100 | — | NG |
| 0.1 | 102 | G | NG |
| 0.2 | 103 | G | NG |
| 0.3 | 104 | G | G |
| 0.4 | 105 | G | G |
| 0.6 | 103 | G | G |
| 0.65 | 102 | G | G |
| 0.7 | 100 | NG | G |
| 0.75 | 98 | NG | NG |
| 0.8 | 94 | NG | NG |
| 0.9 | 84 | NG | NG |
| 1 | 67 | NG | NG |

As shown in FIG. 1, the inductor 200 including a magnetic member 12 with a thickness satisfying the relation of P1<0.7 has an inductance larger than the inductor 200 including no magnetic member 12 (i.e., P1=0). The reason of this is considered that, since the magnetic member 12 is present between the magnetic member 11 and the magnetic member 13 without the magnetic member 11 directly in contact with the magnetic member 13, the magnetic flux directed from the magnetic member 13 to the magnetic member 11 can change its direction inside the magnetic member 12 and thus a cross section of a larger region of the magnetic member 11 can serve as an effective magnetic path.

In view of the value of the inductance and the uniformity of the magnetic flux of FIG. 1, it can be said that the ratio P1 is preferably within a range of 0.3 to 0.65 (30% to 65%), in other words, the first condition described above is satisfied preferably.

The inventors of the present application also studied a value of a ratio P2 (=D1/(D2+D3)) of the thickness of the magnetic member 11 (corresponding to the thickness of the coil 2) with respect to a total thickness of the magnetic members 12, 13 located on the outer side of the coil 2 (upper and lower sides of the coil 2).

For this consideration, the inventors of the present application conduct the simulation of the intensity distribution of the magnetic flux density inside the core 10 with various values of the ratio P2 with respect to each of various values of the ratio P1. As to the parameters for the simulation, in similar to the case of FIG. 6A, the relative magnetic permeability of the magnetic member 11 and the magnetic member 12 is set to 30, the relative magnetic permeability of the magnetic member 13 along the axis direction X1 is set to 2, and the relative magnetic permeability of the magnetic member 13 along the direction perpendicular to the axis direction X1, which corresponds to the lengthwise direction of the magnetic member 13, is set to 200. FIGS. 6A, 9, and 10 correspond to cases of the ratio P2=0.9.

FIGS. 11 to 16 illustrate results of the simulation. In similar to FIG. 6A, FIGS. 11 to 16 each show the intensity of the magnetic flux density with a grayscale where the color approaches white as the intensity of the magnetic flux density increases. In FIGS. 11 to 16, the blackest colored region represents the coil 2.

Figure 11:
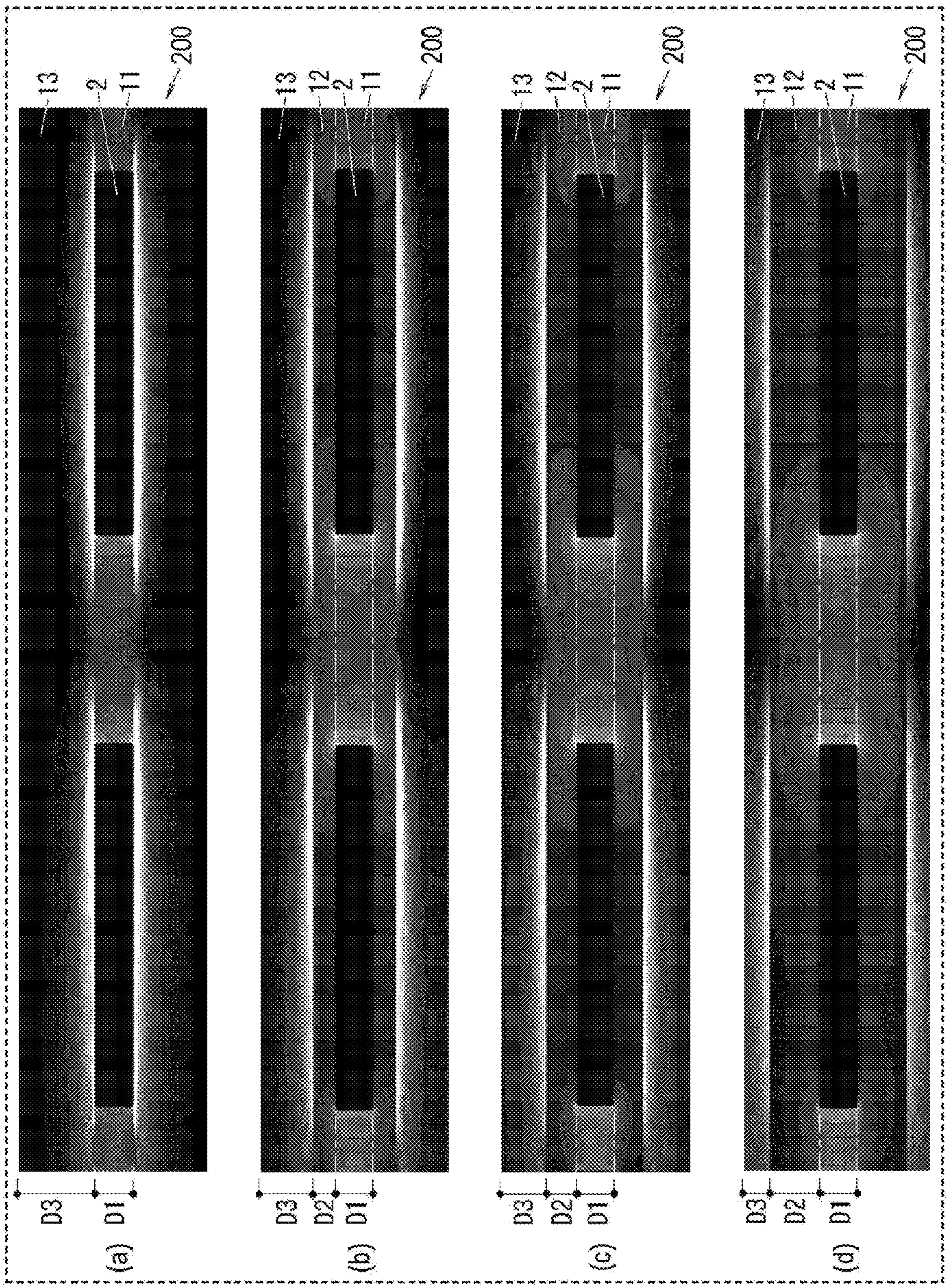
FIG. 11 illustrates results of simulation of distribution of magnetic flux density inside a magnetic component of electric device according to the embodiment.

FIG. 11 illustrates results of the simulation in cases of the ratio P2=0.5. FIG. 11 of (a) illustrates a result of the simulation in a case of the ratio P2=0.5 and the ratio P1=0, FIG. 11 of (b) illustrates a result of the simulation in a case of the ratio P2=0.5 and the ratio P1=0.3, FIG. 11 of (c) illustrates a result of the simulation in a case of the ratio P2=0.5 and the ratio P1=0.4, and FIG. 11 of (d) illustrates a result of the simulation in a case of the ratio P2=0.5 and the ratio P1=0.65.

Figure 12:
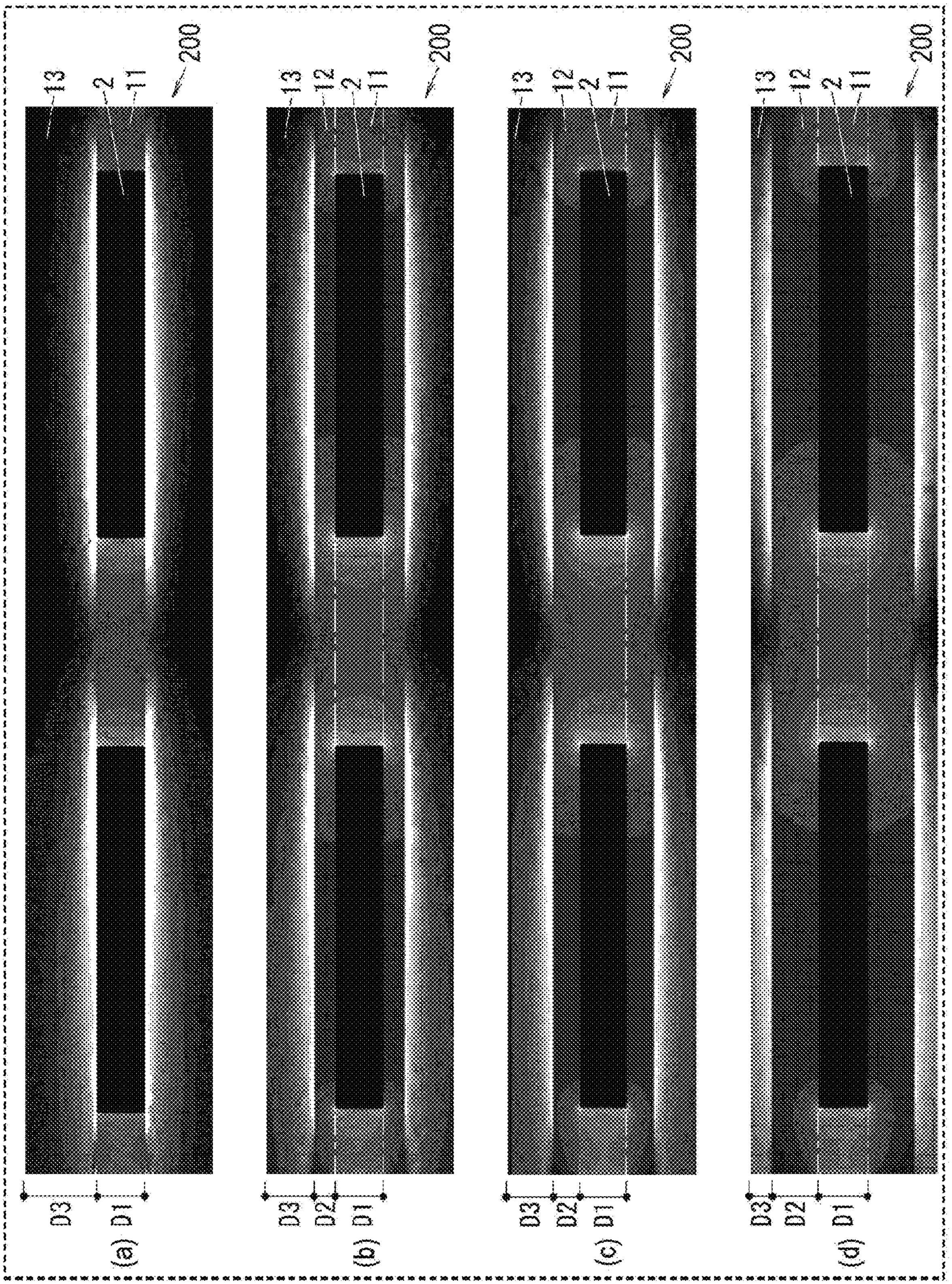
FIG. 12 illustrates results of simulation of distribution of magnetic flux density inside a magnetic component of electric device according to the embodiment.

FIG. 12 illustrates results of the simulation in cases of the ratio P2=0.7. FIG. 12 of (a) illustrates a result of the simulation in a case of the ratio P2=0.7 and the ratio P1=0, FIG. 12 of (b) illustrates a result of the simulation in a case of the ratio P2=0.7 and the ratio P1=0.3, FIG. 12 of (c) illustrates a result of the simulation in a case of the ratio P2=0.7 and the ratio P1=0.4, and FIG. 12 of (d) illustrates a result of the simulation in a case of the ratio P2=0.7 and the ratio P1=0.65.

Figure 13:
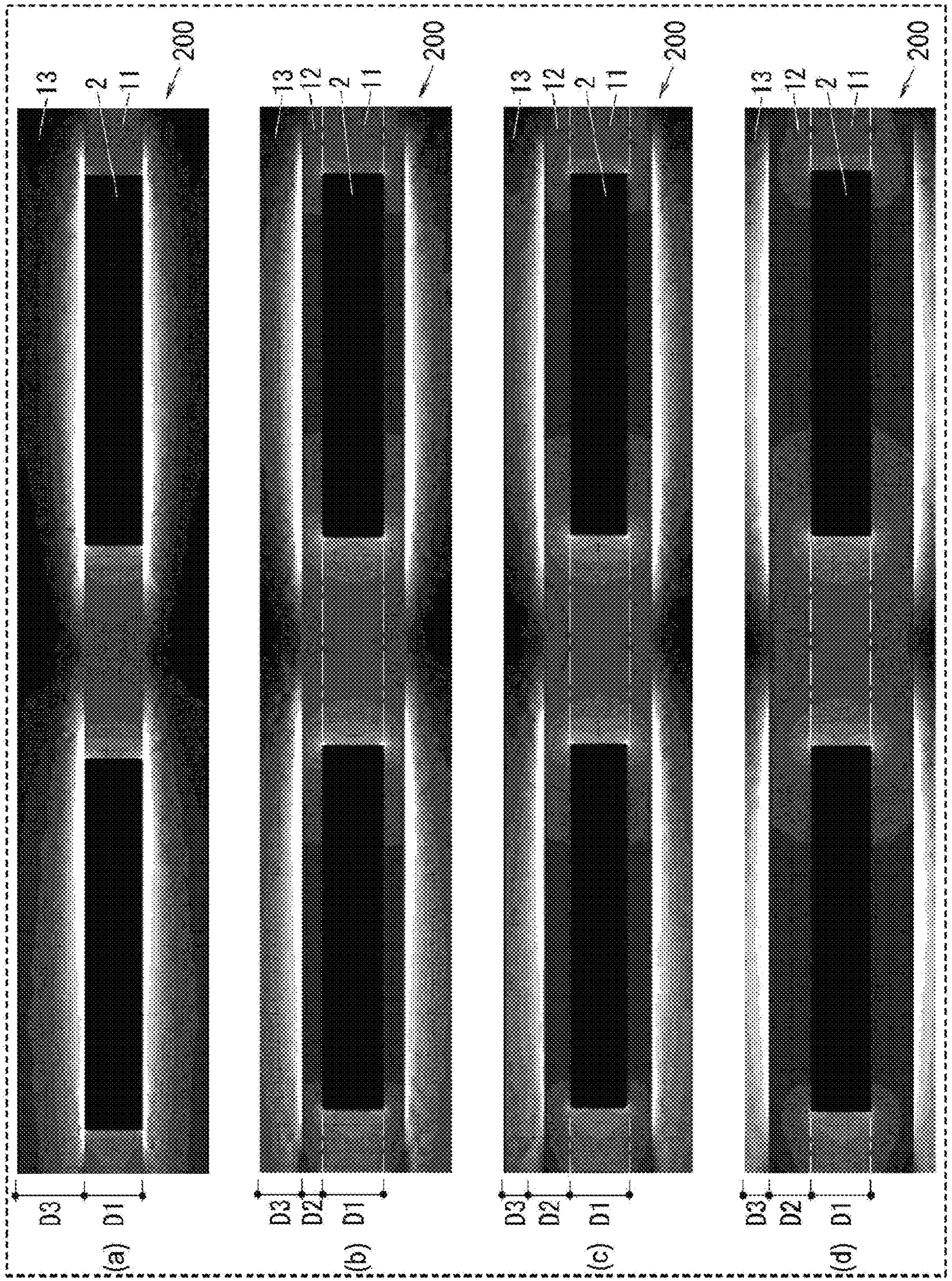
FIG. 13 illustrates results of simulation of distribution of magnetic flux density inside a magnetic component of electric device according to the embodiment.

FIG. 13 illustrates results of the simulation in cases of the ratio P2=0.9. FIG. 13 of (a) illustrates a result of the simulation in a case of the ratio P2=0.9 and the ratio P1=0, FIG. 13 of (b) illustrates a result of the simulation in a case of the ratio P2=0.9 and the ratio P1=0.3, FIG. 13 of (c) illustrates a result of the simulation in a case of the ratio P2=0.9 and the ratio P1=0.4, and FIG. 13 of (d) illustrates a result of the simulation in a case of the ratio P2=0.9 and the ratio P1=0.65.

Figure 14:
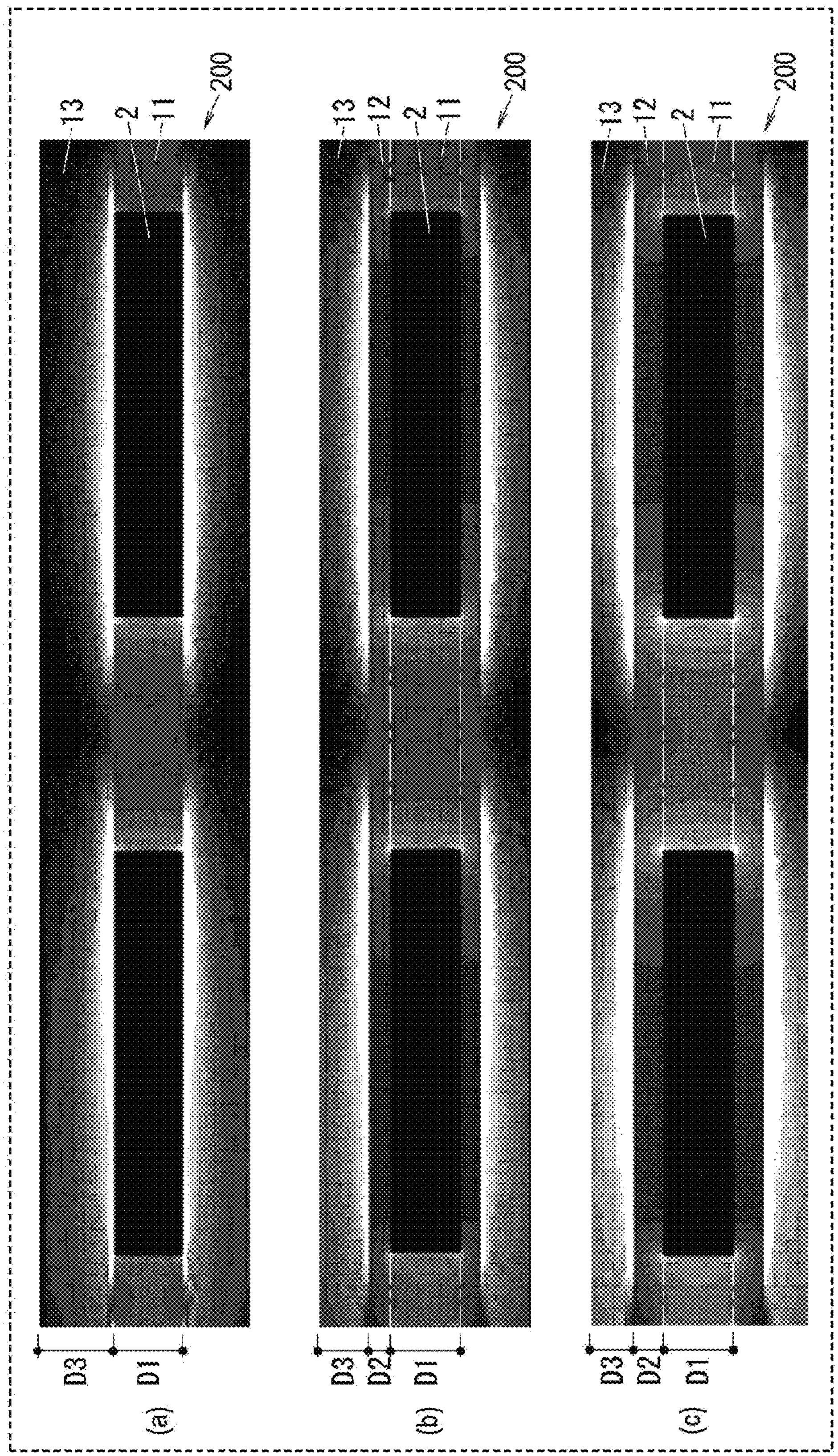
FIG. 14 illustrates results of simulation of distribution of magnetic flux density inside a magnetic component of electric device according to the embodiment.
Figure 15:
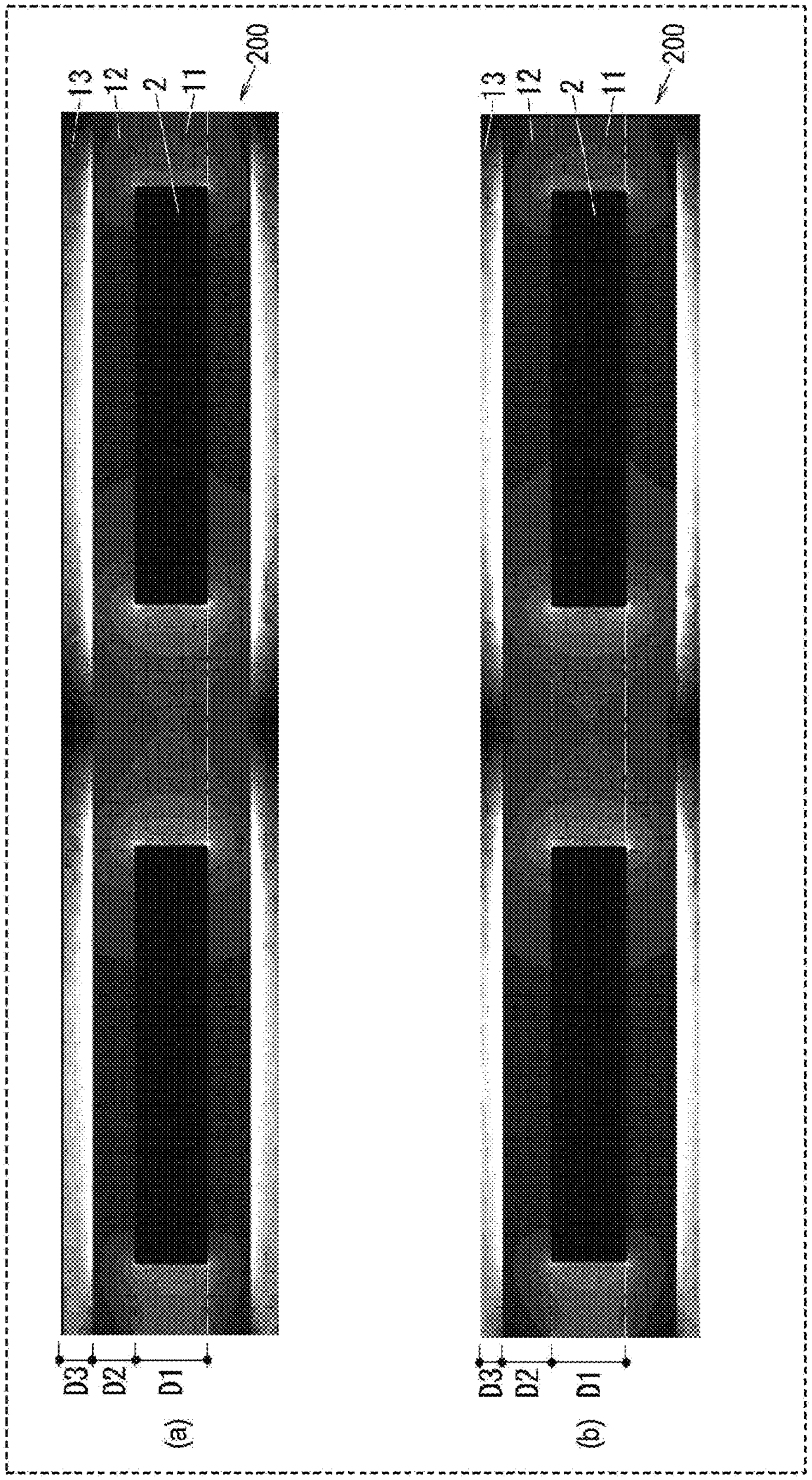
FIG. 15 illustrates results of simulation of distribution of magnetic flux density inside a magnetic component of electric device according to the embodiment.

FIGS. 14 and 15 illustrate results of the simulation in cases of the ratio P2=1. FIG. 14 of (a) illustrates a result of the simulation in a case of the ratio P2=1 and the ratio P1=0, FIG. 14 of (b) illustrates a result of the simulation in a case of the ratio P2=1 and the ratio P1=0.3, FIG. 14 of (c) illustrates a result of the simulation in a case of the ratio P2=1 and the ratio P1=0.4, FIG. 15 of (a) illustrates a result of the simulation in a case of the ratio P2=1 and the ratio P1=0.6, and FIG. 15 of (b) illustrates a result of the simulation in a case of the ratio P2=1 and the ratio P1=0.65.

Figure 16:
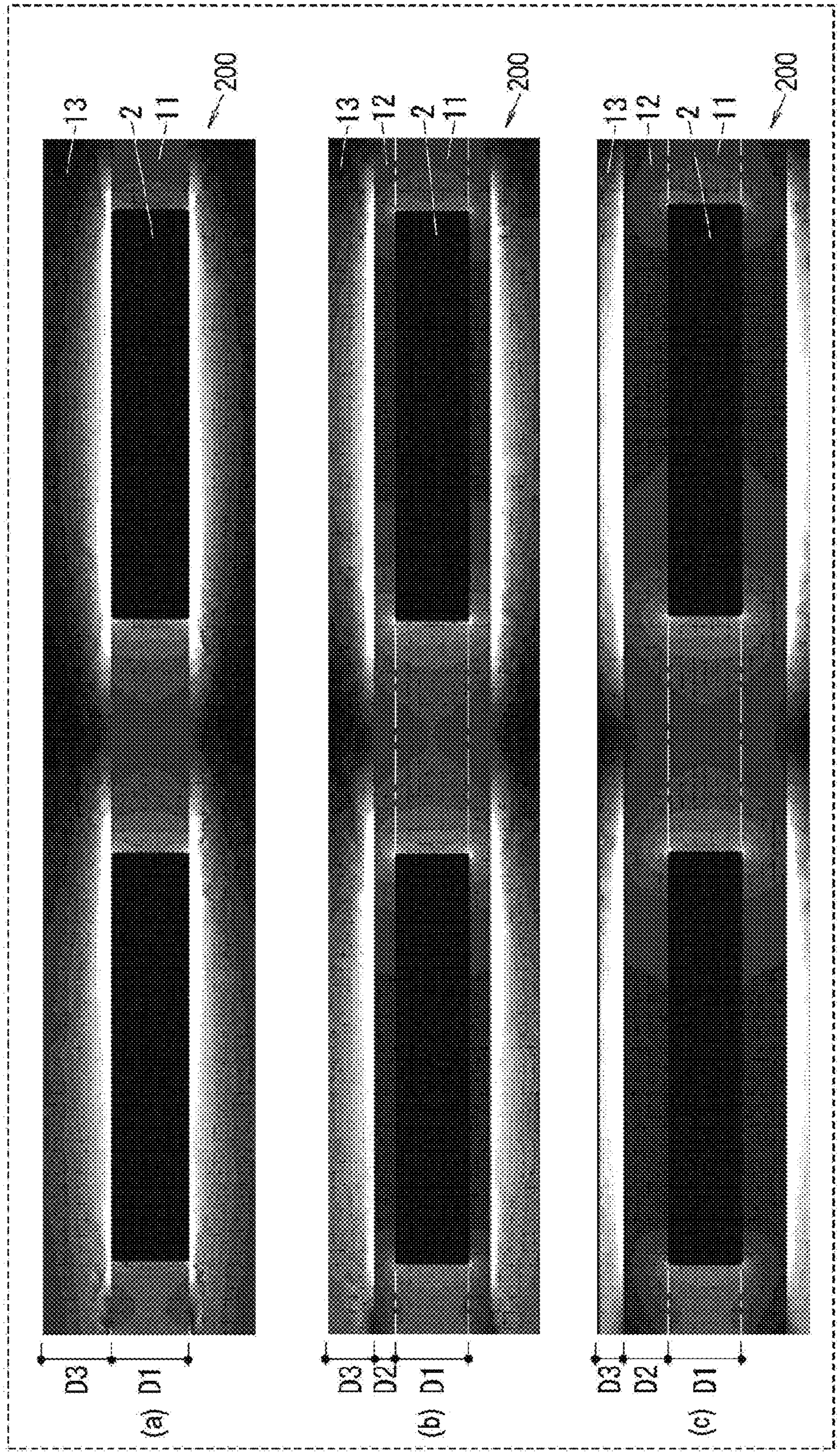
FIG. 16 illustrates results of simulation of distribution of magnetic flux density inside a magnetic component of electric device according to the embodiment.

FIG. 16 illustrates results of the simulation in cases of the ratio P2=1.1. FIG. 16 of (a) illustrates a result of the simulation in a case of the ratio P2=1.1 and the ratio P1=0, FIG. 16 of (b) illustrates a result of the simulation in a case of the ratio P2=1.1 and the ratio P1=0.3, FIG. 16 of (c) illustrates a result of the simulation in a case of the ratio P2=1.1 and the ratio P1=0.65.

Table 2 shows the inductance of the inductor 200 under various values of the ratio P2 and various values of the ratio P1. The values of the inductance are normalized such that the values of the inductance of the inductor having the ratio P1 of 0 is set to 100, for each of the ratios P1. The evaluation standard for the uniformity of the magnetic flux for Table 2 is the same as that for Table 1.

| Ratio P2 | Ratio P1 | Inductance | Uniformity of Magnetic Flux |
|---|---|---|---|
| 1.1 | 0 | 100 | NG |
| | 0.3 | 103 | NG |
| | 0.65 | 97 | NG |
| 1 | 0 | 100 | NG |
| | 0.3 | 104 | G |
| | 0.4 | 104 | G |
| | 0.6 | 101 | G |
| | 0.65 | 100 | NG |
| 0.9 | 0 | 100 | NG |
| | 0.3 | 104 | G |
| | 0.4 | 105 | G |
| | 0.65 | 102 | G |
| 0.7 | 0 | 100 | NG |
| | 0.3 | 107 | G |
| | 0.4 | 108 | G |
| | 0.65 | 108 | G |
| 0.5 | 0 | 100 | NG |
| | 0.3 | 109 | G |
| | 0.4 | 111 | G |
| | 0.65 | 114 | G |

As can be seen from Table 2, an excess thickness D1 of the magnetic member 11 (i.e., P2=1.1) of the inductor 200 causes a reduction in the effect of increasing the inductance provided by the magnetic member 12. The reason of this is considered that, when the magnetic member 11 has an excess thickness, the effect of increasing the inductance provided by the magnetic member 12 that increases the cross section of the effective magnetic path in the magnetic member 11 is suppressed.

As can be seen from Table 2, in view of the value of the inductance and the uniformity of the magnetic flux, it can be said that the ratio P2 is preferably smaller than or equal to 1, in other words 100%. Moreover, when the thickness D1 of the magnetic member 11 corresponding to the thickness of the coil 2 is small, it may be difficult to increase the number of turn of the winding wire 20. In view of this, it can be said that the ratio P2 is preferably larger than or equal to 0.5.

In short, the second condition described above is satisfied preferably. The second condition includes that, in the axis direction X1, the dimension D1 of the magnetic member 11 falls within a range of 50% to 100% of a total of the dimension D2 of the magnetic member 12 e.g., the magnetic member 121 and the dimension D3 of the magnetic member 13 e.g., the magnetic member 131 that are located on one side in the axis direction X1 with respect to the coil 2.

In consideration with the results for the cases of the ratio P2=1, it can be said that the ratio P1 is preferably within a range of 0.3 to 0.6 (30% to 60%).

Setting the thicknesses of the magnetic member 11, the magnetic member(s) 12 (121, 122) and the magnetic member(s) 13 (131, 132) so that the first condition and the second condition are satisficed can increase the inductance of the inductor 200 with the magnetic loss reduced.

(3) Variation

The embodiment described above is mere an example of various embodiments of the present disclosure. Various modifications may be made to the above embodiment depending on design and the like as long as the object of the present disclosure is achieved. Some variations of the above embodiment are described below. Features of the variations explained hereinafter can be mixed those of the above embodiment.

An inductor 200 is not limited to an integrally molded article with a coil 2 such that the coil 2 is inserted. A core 10 of the inductor 200 may be produced separately from the coil 2 and be fitted to the coil 2. The core 10 may be a dust core produced by molding a magnetic powder.

Figure 17:
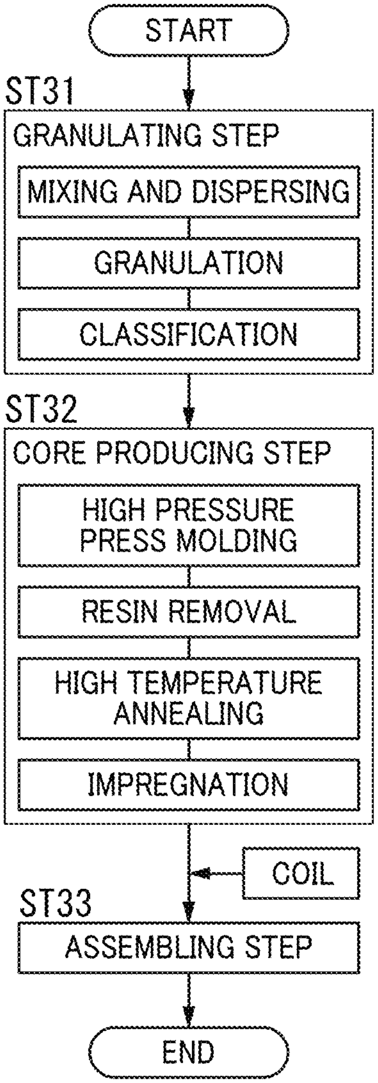
FIG. 17 illustrates a flowchart of yet another producing method of the electric device according to the embodiment.

A producing method of the inductor 200 of the prevent variation is described. FIG. 17 is a flowchart showing the producing method of the inductor 200, as an electric device of the present variation.

As shown in FIG. 17, the producing method of the present variation includes a granulating step ST31, a core producing step ST32, and an assembling step ST33.

The granulating step ST31 includes preparing isotropic magnetic material as a basis of magnetic members 11, 12 and anisotropic magnetic material as a basis of a magnetic member 13, which are to be formed into the core 10. Raw materials of the isotropic magnetic material and the anisotropic magnetic material may be the same as those described in the sheet molding method of the above embodiment.

The granulating step ST31 includes kneading a mixture of an organic solvent containing resin 32 and a magnetic metal powder 31 to obtain a clay-like mixture where the magnetic metal powder 31 is dispersed (Mixing and Dispersing). The granulating step ST31 includes kneading a mixture of an organic solvent resin 42 and a magnetic metal powder 41 to obtain a clay-like mixture where the magnetic metal powder 41 is dispersed (Mixing and Dispersing). In this step, inorganic insulating material and/or additive may be further mixed.

The granulating step ST31 includes forming the mixture into a block shape (column shape, for example) and drying it to remove the solvent from the mixture. The step includes fragmenting the block of the mixture to obtain solid pieces thus fragmented (Granulation). The solid pieces include a plurality of grains having various sizes, the grains including the magnetic metal powder 31 or 41 of which surfaces are coated with resin having substantially constant thicknesses. The step includes classifying the solid pieces according to their sizes to obtain a granular powder having grain sizes falling within a desired range (Classification).

The core producing step ST32 includes press-molding the granular powder with the use of the molding mold to form a molded body with a desired shape (High Pressure Press Molding). The press-molding includes forming, e.g., two split cores having E-shape cross section, and two plate cores having flat plate shape.

Each of the split cores has a shape obtained by evenly dividing, into the upper part and the lower part in the axis direction X1, a total region of the magnetic member 11 and the magnetic member 12 of the core 10 shown in FIG. 1B. Each of the split core is made of the granular powder containing the magnetic metal powder 31. Each of the split core includes: a bottom plate portion including the magnetic member 12; and three leg portions including the magnetic member 11 and protrude from the bottom plate portion.

Each of the plate cores has a shape corresponding to a shape of the magnetic member 13. Each of the plate cores is made of the granular powder containing the magnetic metal powder 41.

The core producing step ST32 includes heating the obtained molded body under an inert gas atmosphere or in the air to remove the resin as a binder from the molded body (Resin Removal).

The core producing step ST32 includes performing heat treatment on the resin removed molded body (High Temperature Annealing). The heat treatment can contribute to reduce the strain of the magnetic metal powder 31, 41 caused by the stress subjected in the press-molding process. This can reduce the hysteresis loss.

The core producing step ST32 includes injecting an impregnation resin into the post-heat treatment molded body (split core) (Impregnation). The resin is removed from the molded body by the heat-treatment, and thus the molded body has a reduced binding power. The impregnation resin is impregnated and injected into the molded body toward the space around the grains of the magnetic metal powder 31, 41. This can increase the mechanical strength of the molded body.

The assembling step ST33 includes grinding the obtained molded body (split core and/or plate core), if necessary. The assembling step ST33 includes bonding each pair of a split core and a plate core, by the adhesive for example, to form two bonded bodies each having E-shape cross section. The two bonded bodies and the coil 2 are assembled to be formed into the inductor 200.

The core 10 (magnetic component 1) made according to this method also includes the magnet member 11, the magnet member 12 and the magnet member 13, and thus can contribute to reduce the magnetic loss.

(3.2) Other Variations

In one variation, an electric device 100 is not limited to an inductor 200, but may be a transformer or other devices.

In one variation, at least one of a magnetic member 11 or a magnetic member 12 may be made of, not isotropic magnetic material, but anisotropic magnetic material. At least one of the magnetic member 11 or the magnetic member 12 may be made of the anisotropic magnetic material, as long as the magnetic member 13 has a magnetic anisotropy larger than any of a magnetic anisotropy of the magnetic member 11 and a magnetic anisotropy of the magnetic member. The magnetic member 12 may be larger in the magnetic anisotropy larger than the magnetic member 11. In other words, the magnetic anisotropy may increase, namely the easy direction of magnetization may become more prominent, in the order of the magnetic member 11, the magnetic member 12, and the magnetic member 13.

In one variation of a sheet molding method, a magnetic member 11 may be made of a member different from a magnetic sheet that is formed into a magnetic member 12.

In one variation, a boundary between a magnetic member 12 and a magnetic member 13 is not limited to have a planar shape. In a case where an inductor 200 is produced according to a sheet molding method, a step may be made in the magnetic member 12 and/or the magnetic member 13 at a region around a boundary between a space 21 in a center of a coil 2 and a winding wire 20. Variations of the magnetic component 1 according to the present disclosure includes a magnetic component having such a step.

In one variation, an easy direction of magnetization of a magnetic member 13 may not be oriented parallel to a plane perpendicular to the axis direction X1. There may be slight deviation and/or curvature.

In one variation where an inductor 200 is a metal composite inductor, a coil 2 may be made as an integrally molded article, integrally molded with at least a part of a core 10 such as a magnetic member 11.

In one variation, a magnetic member 11 is not limited to include a portion 112.

In one variation, a winding wire 20 is not limited to have a two layers structure including a portion located on the same layer as an electrode 201 and a portion located on the same layer as an electrode 202, but may have a single layer structure or three or more layers structure.

(4) Aspect

As can be seen from the embodiment and variations described above, disclosed are the following aspects.

A magnetic component (1) of the first aspect includes a magnetic member (11), a magnetic member (12) and a magnetic member (13). The magnetic member (11) is disposed in the same layer as a coil (2) in an axis direction (X1). The magnetic member (12) is disposed on an outer side of the coil (2) in the axis direction (X1). The magnetic member (12) is disposed on an outer side of the magnetic member (12) in the axis direction (X1). The magnetic member (13) is larger in magnetic anisotropy than each of the magnetic member (11) and the magnetic member (12). The magnetic member (13) has an easy direction of magnetization oriented perpendicular to the axis direction (X1).

This aspect can contribute to reduce magnetic loss.

In the magnetic component (1) of the second aspect referring to the first aspect, the magnetic member (11) is made of isotropic magnetic material. The magnetic member (13) is made of anisotropic magnetic material.

This aspect can contribute to reduce magnetic loss.

In the magnetic component (1) of the third aspect referring to the first or second aspect, the magnetic member (11) and the magnetic member (12) are made of the same material as each other.

This aspect can contribute to reduce magnetic loss.

In the magnetic component (1) of the fourth aspect referring to any one of the first to third aspects, in the axis direction (X1), the magnetic member (12) has a dimension (D2), which falls within a range of 30% to 65% of a total of the dimension (D2) of the magnetic member (12) and a dimension (D3) of the magnetic member (13).

This aspect can contribute to increase the inductance with magnetic loss reduced.

In the magnetic component (1) of the fifth aspect referring to any one of the first to fourth aspects, in the axis direction (X1), the magnetic member (11) has a dimension (D1), which falls within a range of 50% to 100% of a total of a dimension (D2) of the magnetic member (12) and a dimension (D3) of the magnetic member (13) that are located on one side in the axis direction (X1) with respect to the coil (2).

This aspect can contribute to increase the inductance with magnetic loss reduced.

The magnetic component (1) of the sixth aspect referring to any one of the first to fifth aspects is a molded article integrally molded with the coil (2) such that the coil (2) is built therein.

This aspect can contribute to reduce magnetic loss of the magnetic component (1) integrally molded with the coil (2).

An electric device (100) of the seventh aspect includes the magnetic component (1) of any one of the first to sixth aspects, and the coil (2).

This aspect can contribute to reduce magnetic loss.

REFERENCE SIGNS LIST

1 MAGNETIC COMPONENT
100 ELECTRIC DEVICE
2 COIL
11 MAGNETIG MEMBER (FIRST MAGNETIG MEMBER)
12 MAGNETIG MEMBER (SECOND MAGNETIG MEMBER, FOURTH MAGNETIC MEMBER)
13 MAGNETIG MEMBER (THIRD MAGNETIG MEMBER, FIFTH MAGNETIC MEMBER)
121 MAGNETIG MEMBER (SECOND MAGNETIG MEMBER)
122 MAGNETIG MEMBER (FOURTH MAGNETIG MEMBER) 131 MAGNETIG MEMBER (THIRD MAGNETIG MEMBER)
132 MAGNETIG MEMBER (FIFTH MAGNETIG MEMBER)
A1 CENTER AXIS
X1 AXIS DIRECTION

The invention claimed is:

1. A magnetic component configured to be used with a coil wound about a center axis along an axis direction, the magnetic component comprising:

a first magnetic member through which magnetic flux generated by the coil passes, the first magnetic member extending in the axis direction to have a first end and a second end in the axis direction and having a portion overlapping with the coil when viewed in a direction perpendicular to the axis direction;

a second magnetic member disposed on an opposite side to the coil with respect to the first end of the first magnetic member, in the axis direction;

a third magnetic member disposed on an opposite side to the coil with respect to the second magnetic member, in the axis direction;

a fourth magnetic member disposed on an opposite side to the coil with respect to the second end of the first magnetic member, in the axis direction; and a fifth magnetic member disposed on an opposite side to the coil with respect to the fourth magnetic member, in the axis direction, wherein:

the coil is wound surrounding an internal space through which the center axis passes, the first magnetic member includes:

a first portion extending in the axis direction and running in the internal space of the coil, the first portion being connected to the second magnetic member and the fourth magnetic member, and a second portion extending in the axis direction and running in a space outside the coil, the second portion being connected to the second magnetic member and the fourth magnetic member, the third magnetic member is larger in magnetic anisotropy than each of the first magnetic member and the second magnetic member, the third magnetic member has an easy direction of magnetization along which the third magnetic member is easily magnetized compared to other directions, the easy direction of magnetization of the third magnetic member is oriented perpendicular to the axis direction, the fifth magnetic member is larger in magnetic anisotropy than each of the first magnetic member, the second magnetic member, and the fourth magnetic member, the fifth magnetic member has an easy direction of magnetization along which the fifth magnetic member is easily magnetized compared to other directions, the easy direction of magnetization of the fifth magnetic member is oriented perpendicular to the axis direction, the second magnetic member has a dimension along the axis direction, which falls within a range of 30% to 60% of a total of the dimension along the axis direction of the second magnetic member and a dimension along the axis direction of the third magnetic member, and the first magnetic member has a dimension along the axis direction, which falls within a range of 50% to 100% of the total of the dimension along the axis direction of the second magnetic member and the dimension along the axis direction of the third magnetic member.

2. The magnetic component of claim 1, wherein the first magnetic member is made of isotropic magnetic material, and the third magnetic member is made of anisotropic magnetic material.

3. The magnetic component of claim 1, wherein the first magnetic member and the second magnetic member are made of same material.

4. The magnetic component of claim 1, wherein the second magnetic member is directly connected to the first end of the first magnetic member, and the third magnetic member is directly connected to the second magnetic member.

5. The magnetic component of claim 1, wherein the second magnetic member is directly connected to the first end of the first magnetic member, the third magnetic member is directly connected to the second magnetic member, the fourth magnetic member is directly connected to the second end of the first magnetic member, and the fifth magnetic member is directly connected to the fourth magnetic member.

6. The magnetic component of claim 1, wherein the magnetic component is a molded article integrally molded with the coil such that the coil is built in the magnetic component.

7. An electric device, comprising:

a coil wound about a center axis along an axis direction; and a magnetic component configured to be used with the coil, wherein:

the magnetic component includes:

a first magnetic member through which magnetic flux generated by the coil passes, the first magnetic member extending in the axis direction to have a first end and a second end in the axis direction and having a portion overlapping with the coil when viewed in a direction perpendicular to the axis direction;

a second magnetic member disposed on an opposite side to the coil with respect to the first end of the first magnetic member, in the axis direction;

a third magnetic member disposed on an opposite side to the coil with respect to the second magnetic member, in the axis direction;

a fourth magnetic member disposed on an opposite side to the coil with respect to the second end of the first magnetic member, in the axis direction; and a fifth magnetic member disposed on an opposite side to the coil with respect to the fourth magnetic member, in the axis direction, the coil is wound surrounding an internal space through which the center axis passes, the first magnetic member includes a first portion extending in the axis direction and running in the internal space of the coil, the first portion being connected to the second magnetic member and the fourth magnetic member, and a second portion extending in the axis direction and running in a space outside the coil, the second portion being connected to the second magnetic member and the fourth magnetic member, the third magnetic member is larger in magnetic anisotropy than each of the first magnetic member and the second magnetic member, the third magnetic member has an easy direction of magnetization along which the third magnetic member is easily magnetized compared to other directions, the easy direction of magnetization of the third magnetic member is oriented perpendicular to the axis direction, the fifth magnetic member is larger in magnetic anisotropy than each of the first magnetic member, the second magnetic member, and the fourth magnetic member, the fifth magnetic member has an easy direction of magnetization along which the fifth magnetic member is easily magnetized compared to other directions, the easy direction of magnetization of the fifth magnetic member is oriented perpendicular to the axis direction, the second magnetic member has a dimension along the axis direction, which falls within a range of 30% to 60% of a total of the dimension along the axis direction of the second magnetic member and a dimension along the axis direction of the third magnetic member, and the first magnetic member has a dimension along the axis direction, which falls within a range of 50% to 100% of the total of the dimension along the axis direction of the second magnetic member and the dimension along the axis direction of the third magnetic member.

* * * * *